(12) United States Patent
Miyamoto et al.

(10) Patent No.: US 10,755,499 B2
(45) Date of Patent: Aug. 25, 2020

(54) OPENING-CLOSING CONTROL DEVICE, OPENING-CLOSING CONTROL METHOD, AND OPENING-CLOSING CONTROL SYSTEM

(71) Applicants: Sony Corporation, Tokyo (JP); Sony Mobile Communications Inc., Tokyo (JP)

(72) Inventors: Takashi Miyamoto, Kanagawa (JP); Katsuyuki Tanaka, Kanagawa (JP); Shinichi Fukuda, Kanagawa (JP); Yoshihito Ishibashi, Tokyo (JP)

(73) Assignees: Sony Corporation, Tokyo (JP); Sony Mobile Communication Inc., Tokyo (JP)

( * ) Notice: Subject to any disclaimer, the term of this patent is extended or adjusted under 35 U.S.C. 154(b) by 0 days.

(21) Appl. No.: 16/077,606

(22) PCT Filed: Feb. 17, 2017

(86) PCT No.: PCT/JP2017/005840
§ 371 (c)(1),
(2) Date: Aug. 13, 2018

(87) PCT Pub. No.: WO2017/169258
PCT Pub. Date: Oct. 5, 2017

(65) Prior Publication Data
US 2019/0035189 A1    Jan. 31, 2019

(30) Foreign Application Priority Data

Mar. 31, 2016    (JP) ................. 2016-070460

(51) Int. Cl.
*G07C 9/00*     (2020.01)
*B60R 25/24*    (2013.01)
*H04B 13/00*    (2006.01)
*E05B 49/00*    (2006.01)
(Continued)

(52) U.S. Cl.
CPC .......... *G07C 9/00182* (2013.01); *B60R 25/24* (2013.01); *E05B 47/0001* (2013.01);
(Continued)

(58) Field of Classification Search
None
See application file for complete search history.

(56) References Cited

U.S. PATENT DOCUMENTS

2006/0232378 A1* 10/2006 Ogino .................. B60R 25/246
340/5.62
2009/0096577 A1    4/2009 Pollabauer
(Continued)

FOREIGN PATENT DOCUMENTS

EP    1 894 795 A1    3/2008
JP      3-55371 A     3/1991
(Continued)

OTHER PUBLICATIONS

Extended European Search Report; Application No./Patent No. 17773806.9-1009 / 3439205 PCT/JP2017005840; dated Mar. 1, 2019.

*Primary Examiner* — Daniell L Negron
(74) *Attorney, Agent, or Firm* — Michael Best & Friedrich LLP

(57) ABSTRACT

An opening-closing control device of the present disclosure includes: a first electrode unit and a second electrode unit that perform communication with an authenticated communication device; an authentication processor that performs authentication processing on the authenticated communication device on a basis of a result of the communication with the authenticated communication device; an opening-closing operation unit that performs an operation on a lockable opening-closing unit; an operation detector that detects an operation state of the opening-closing operation unit; and a controller that locks or unlocks the opening-closing unit on (Continued)

a basis of a result of the authentication processing and a result of detection of the operation state.

18 Claims, 14 Drawing Sheets

(51) Int. Cl.
  *E05B 47/00* (2006.01)
  *B60R 25/01* (2013.01)

(52) U.S. Cl.
  CPC ............ *E05B 49/00* (2013.01); *H04B 13/00* (2013.01); *H04B 13/005* (2013.01); *B60R 25/01* (2013.01); *E05B 2047/0068* (2013.01); *G07C 2009/00809* (2013.01); *G07C 2209/65* (2013.01)

(56) References Cited

U.S. PATENT DOCUMENTS

| | | | |
|---|---|---|---|
| 2012/0032778 | A1 | 2/2012 | Nakano et al. |
| 2017/0030119 | A1* | 2/2017 | Usui ..................... E05B 81/77 |
| 2017/0270721 | A1* | 9/2017 | Graafstra ........... G07C 9/00087 |

FOREIGN PATENT DOCUMENTS

| | | |
|---|---|---|
| JP | 2001-323695 A | 11/2001 |
| JP | 2009-535540 A | 10/2009 |
| JP | 2011-205319 A | 10/2011 |
| JP | 2015-63879 A | 4/2015 |
| WO | 2014/006748 A1 | 1/2014 |

* cited by examiner

[FIG. 1]
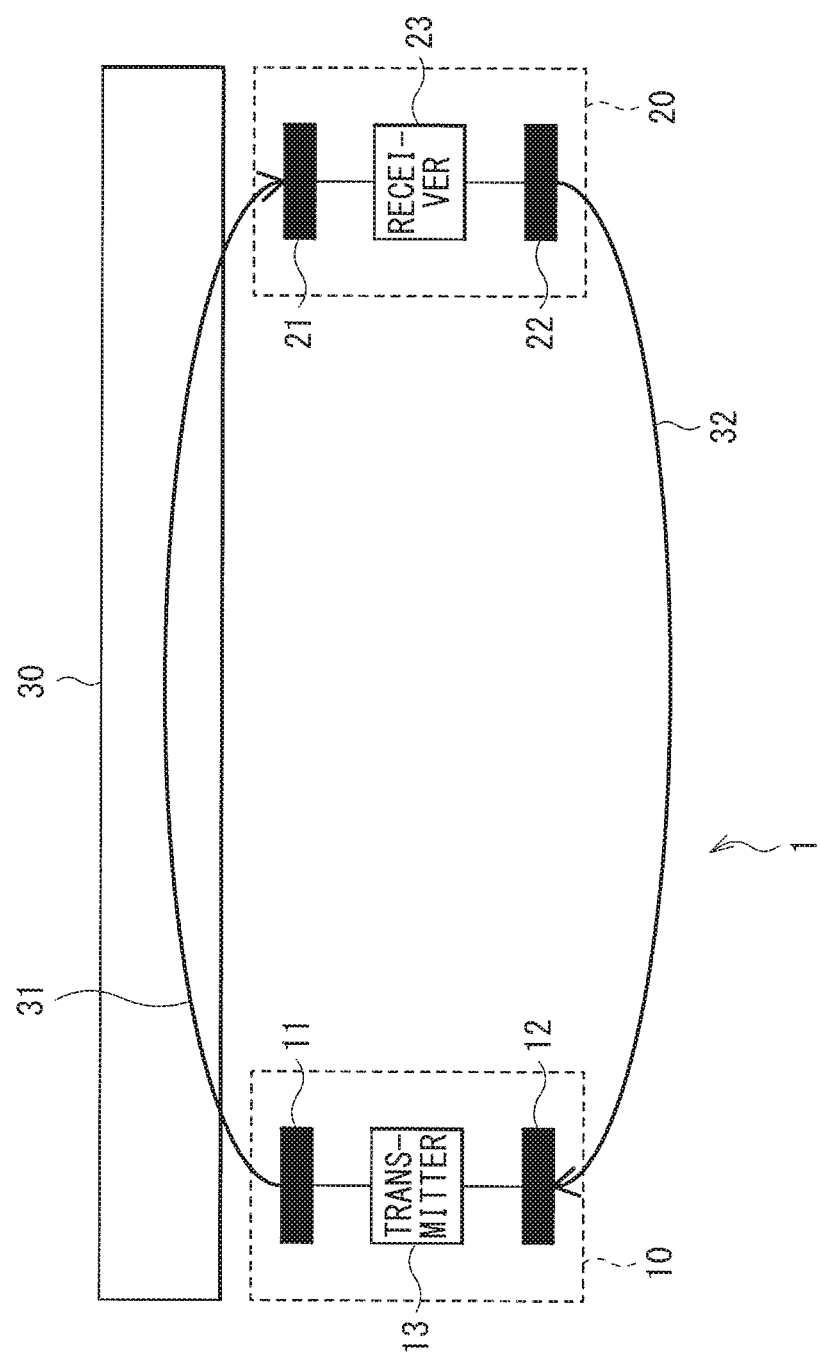

[FIG. 2]
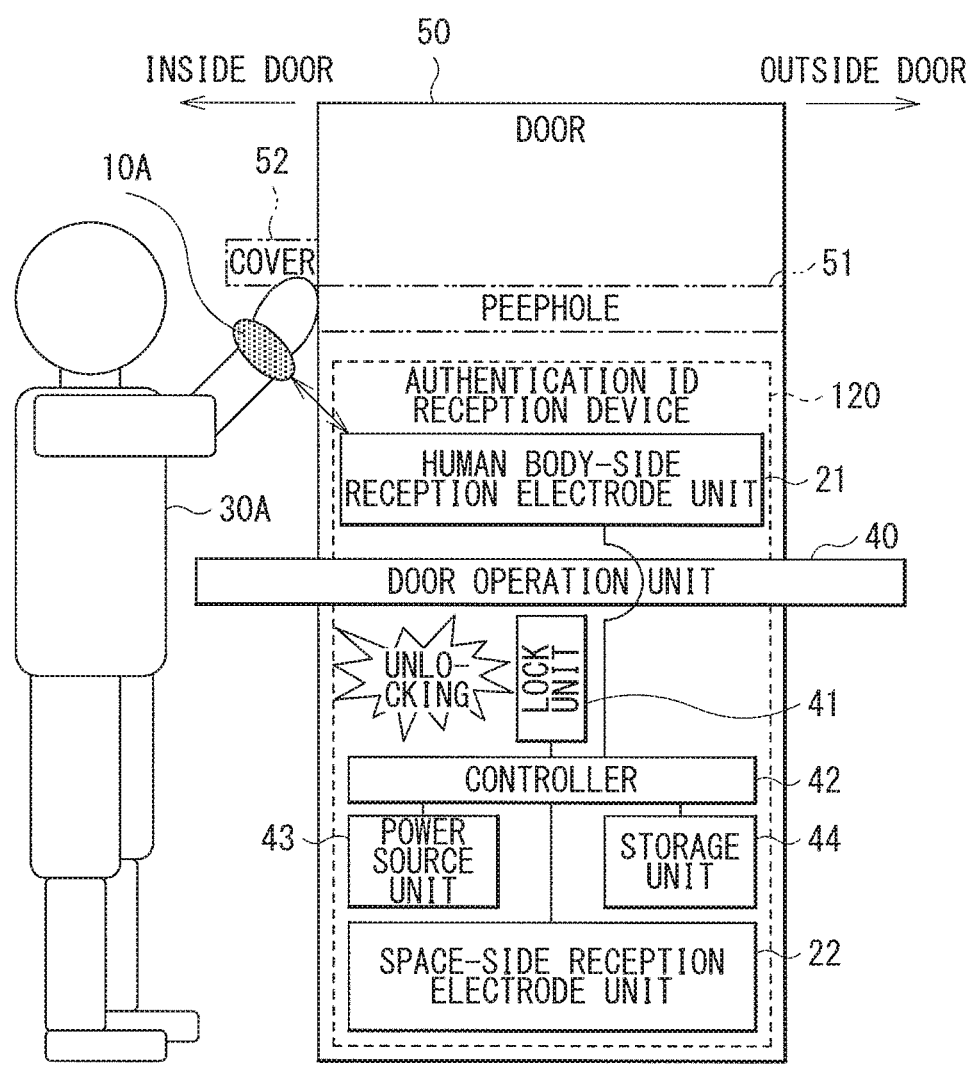

[ FIG. 3 ]
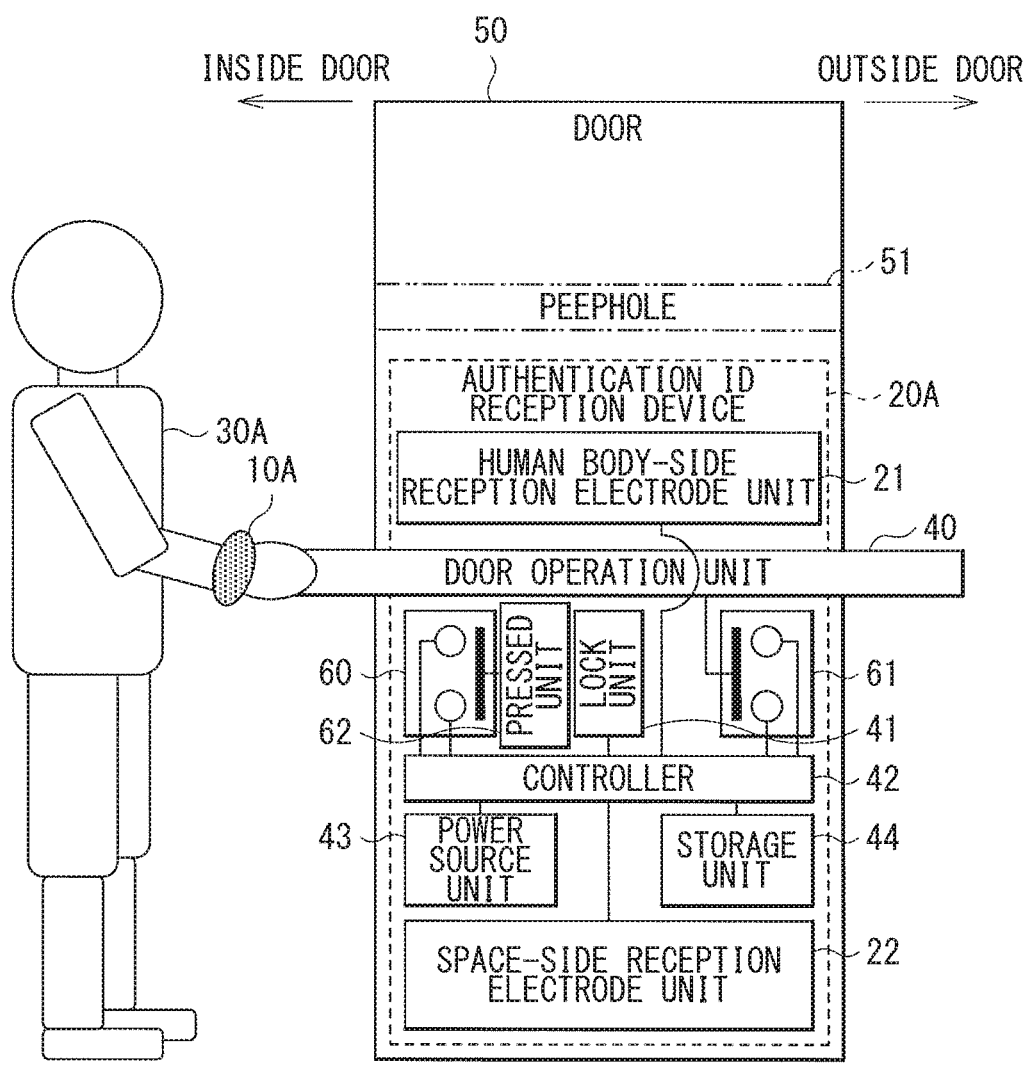

[FIG. 4]
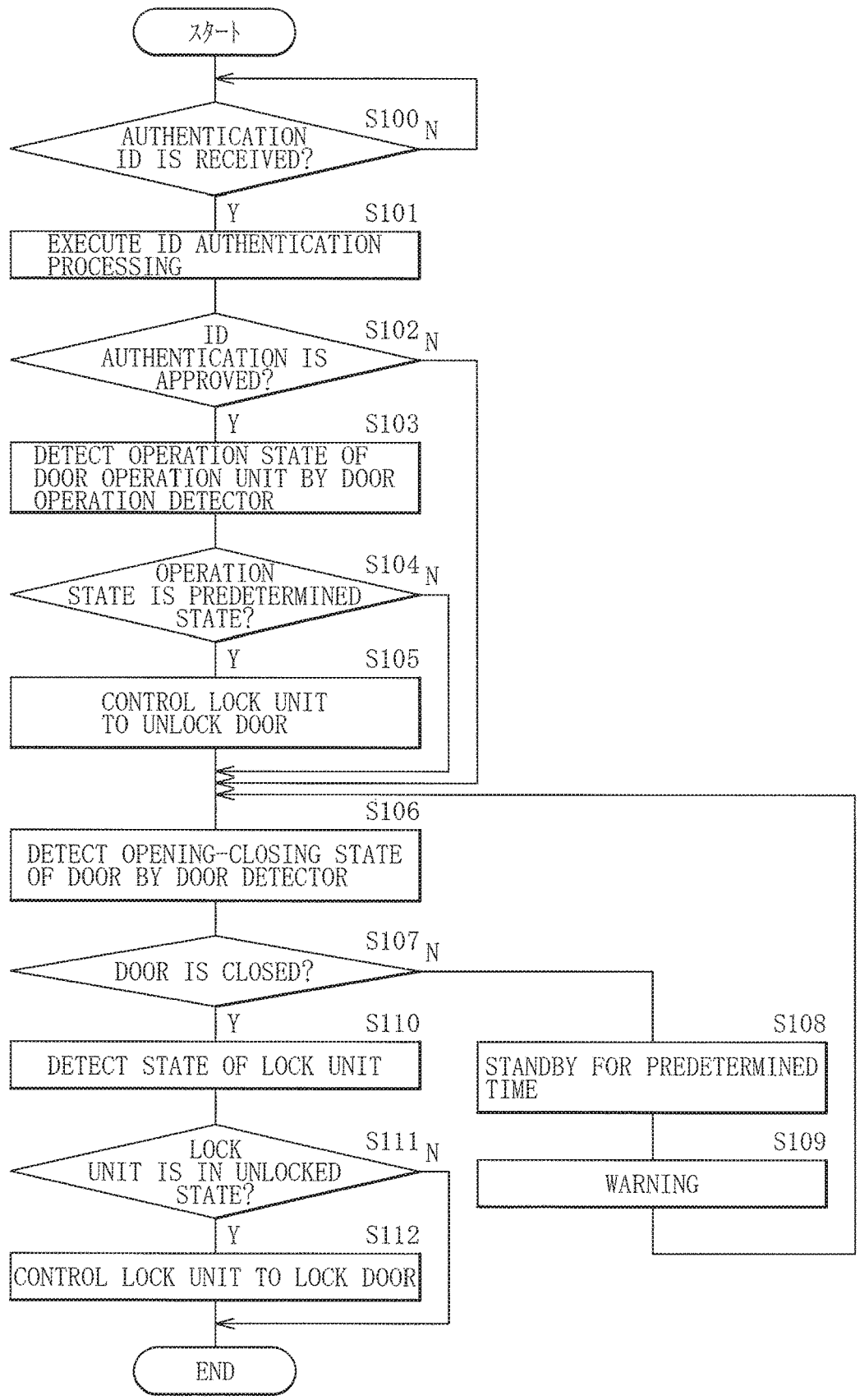

[FIG. 5]
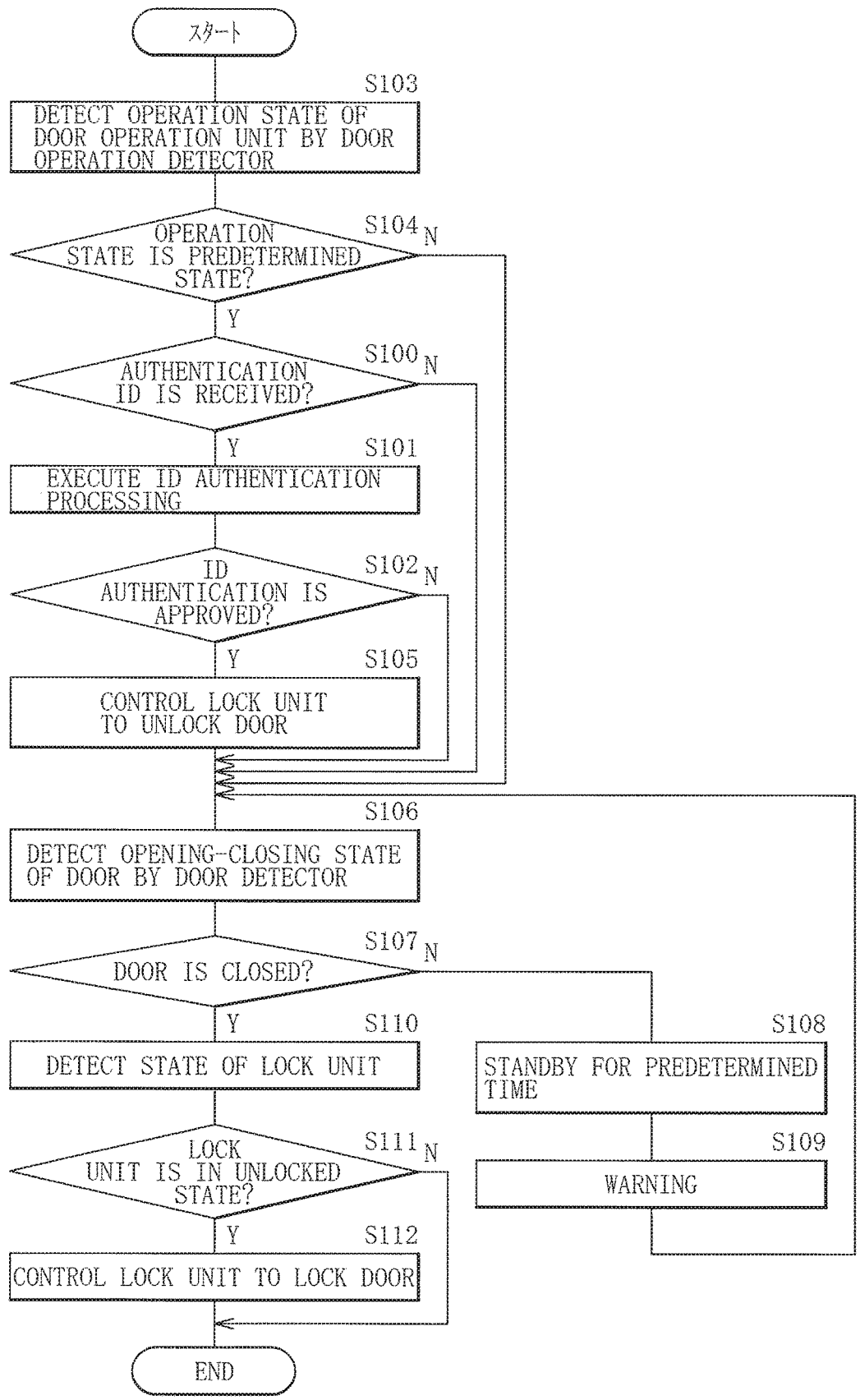

[FIG. 6]
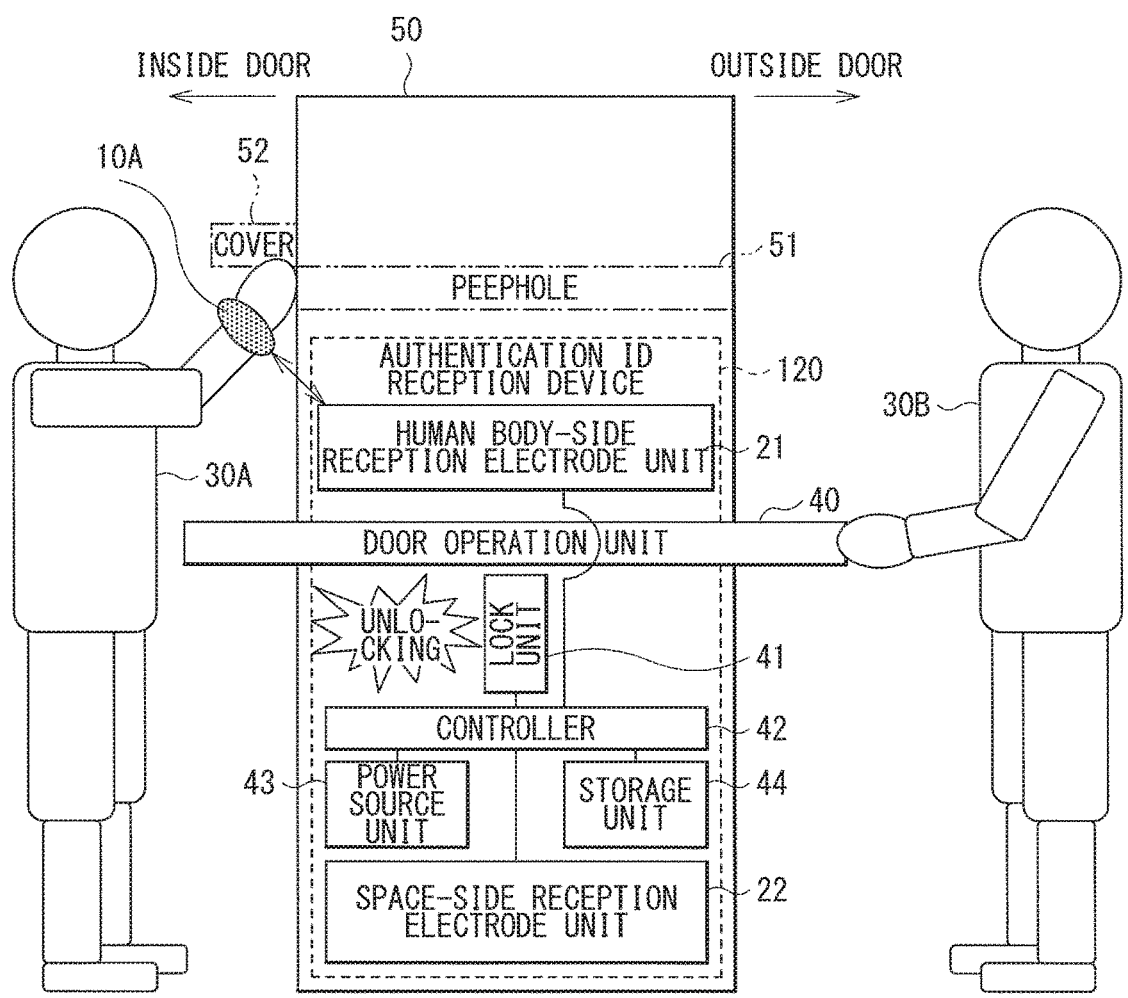

[ FIG. 7 ]
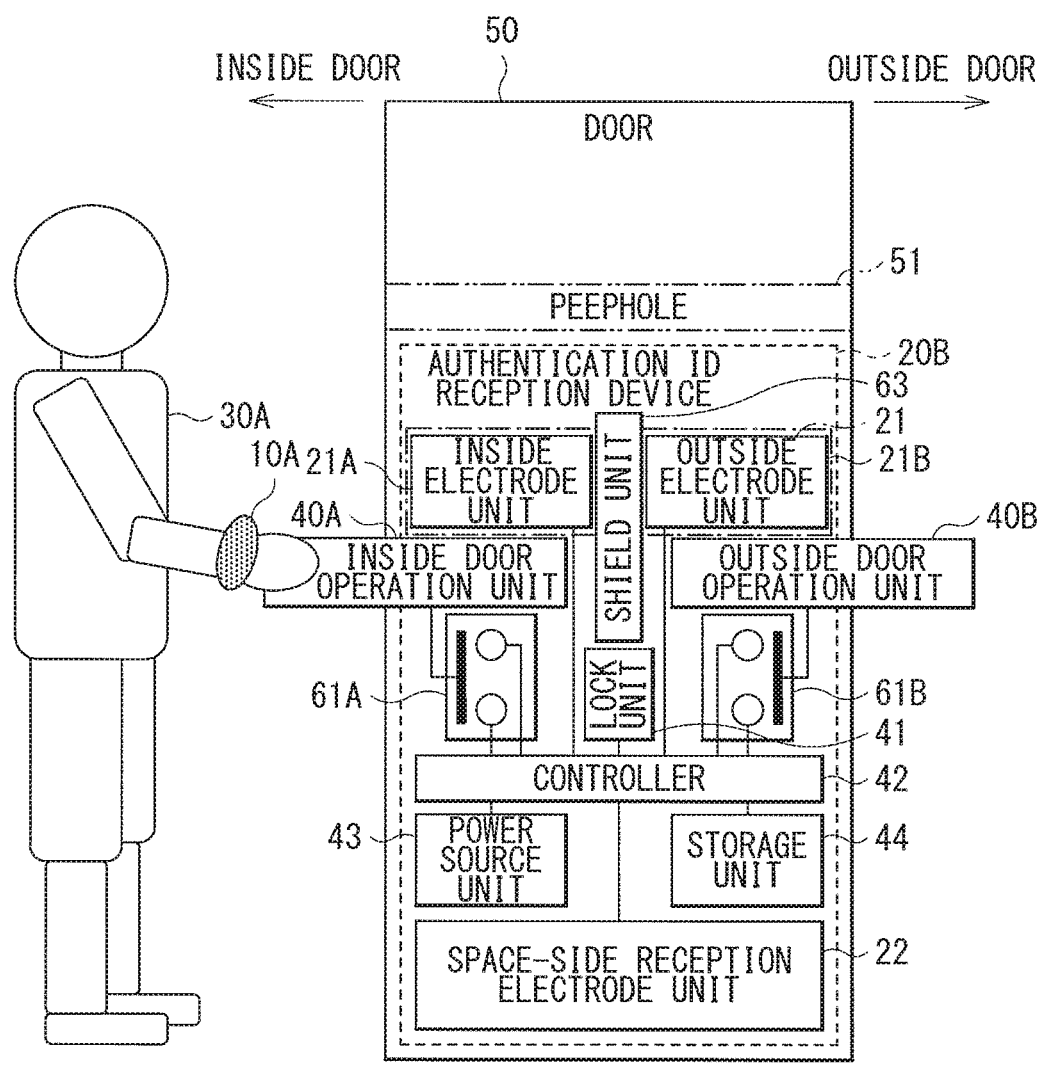

[FIG. 8]
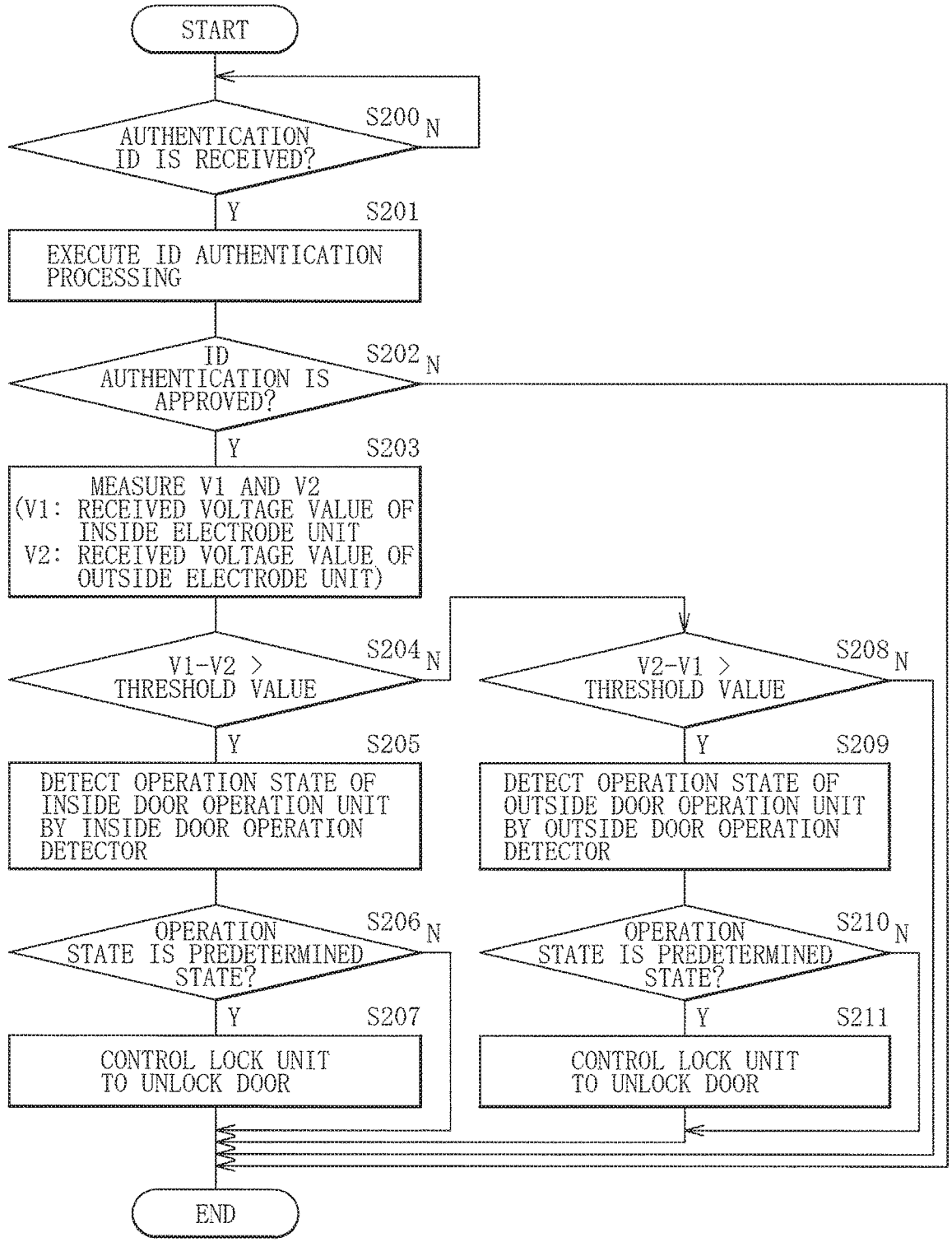

[FIG. 9]
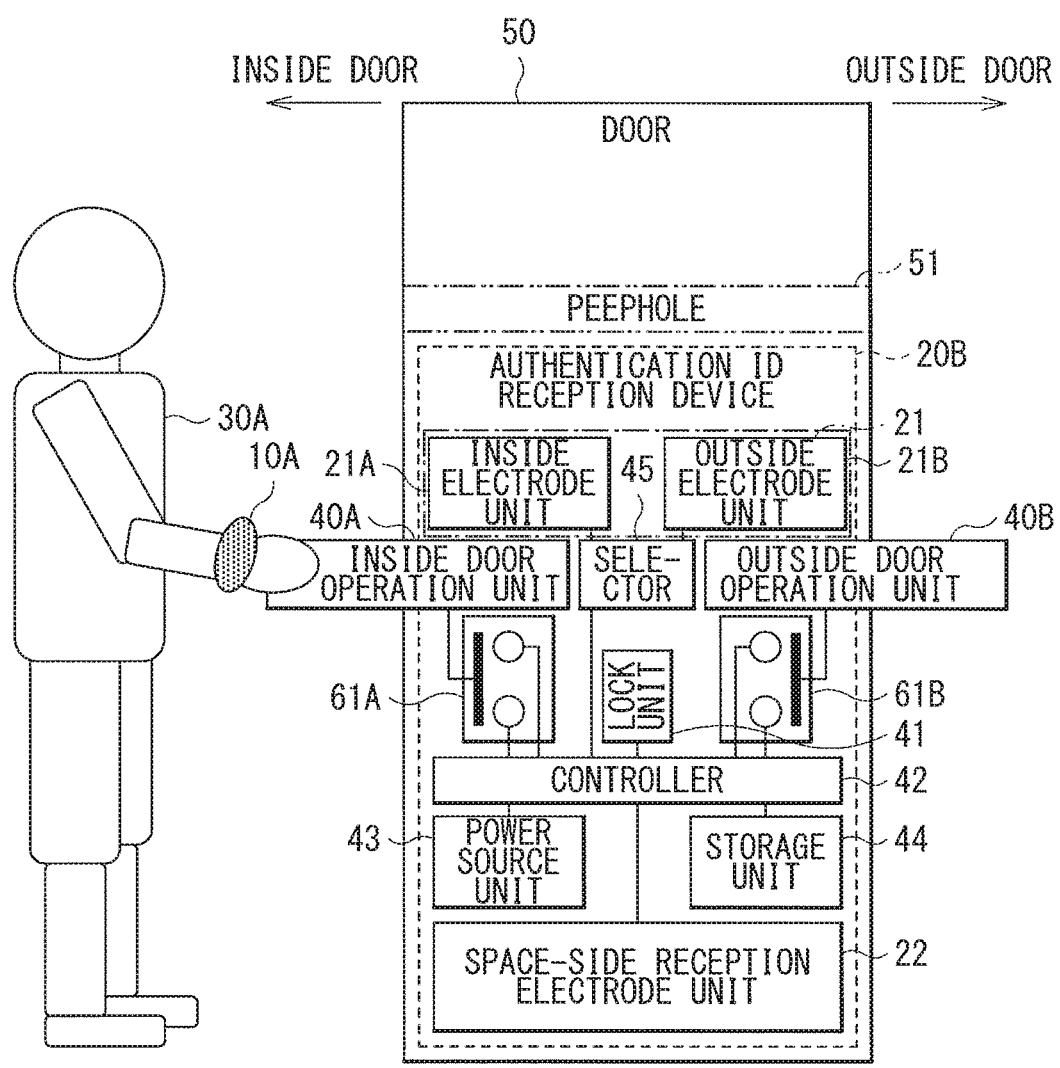

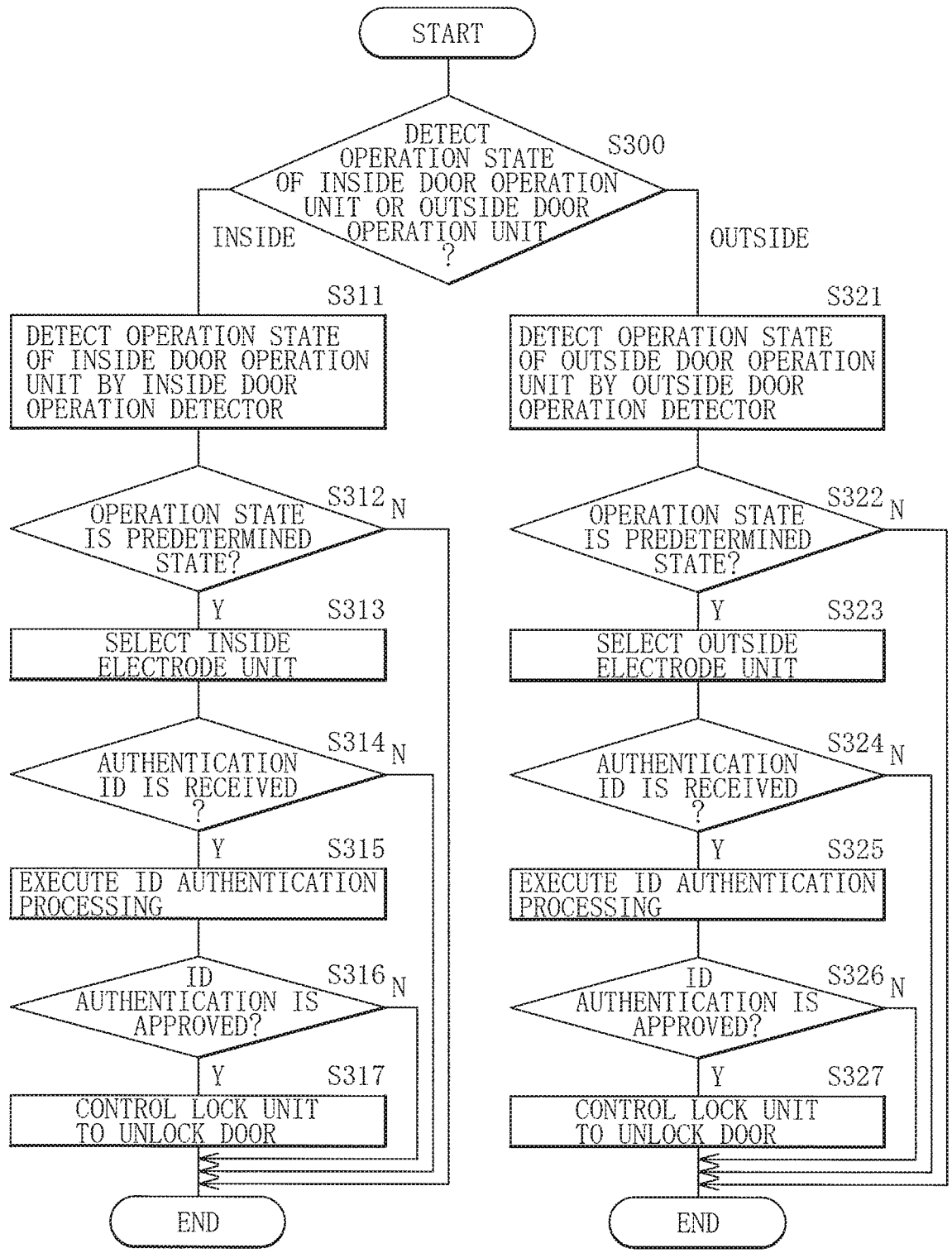
[FIG. 10]

[ FIG. 11 ]
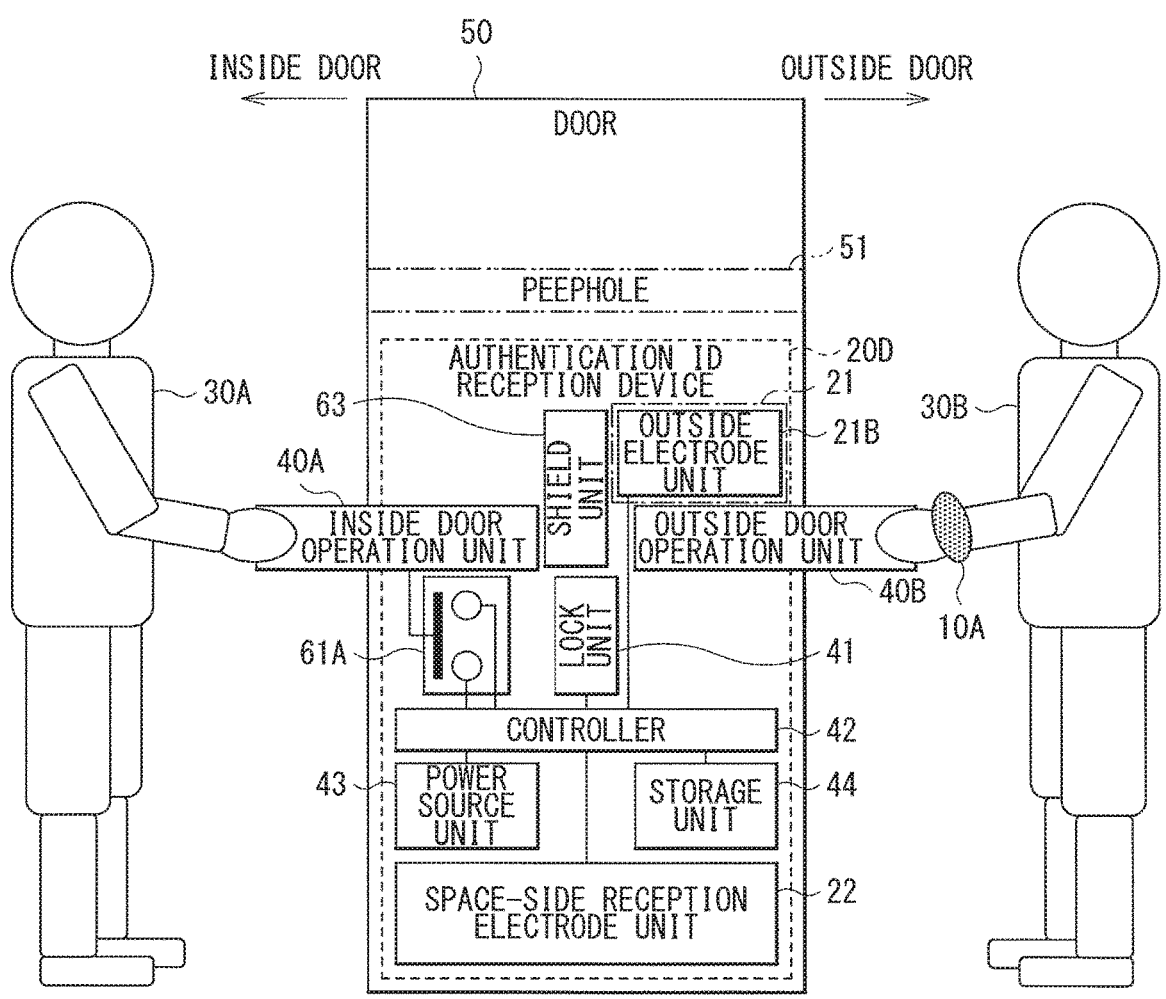

[ FIG. 12 ]
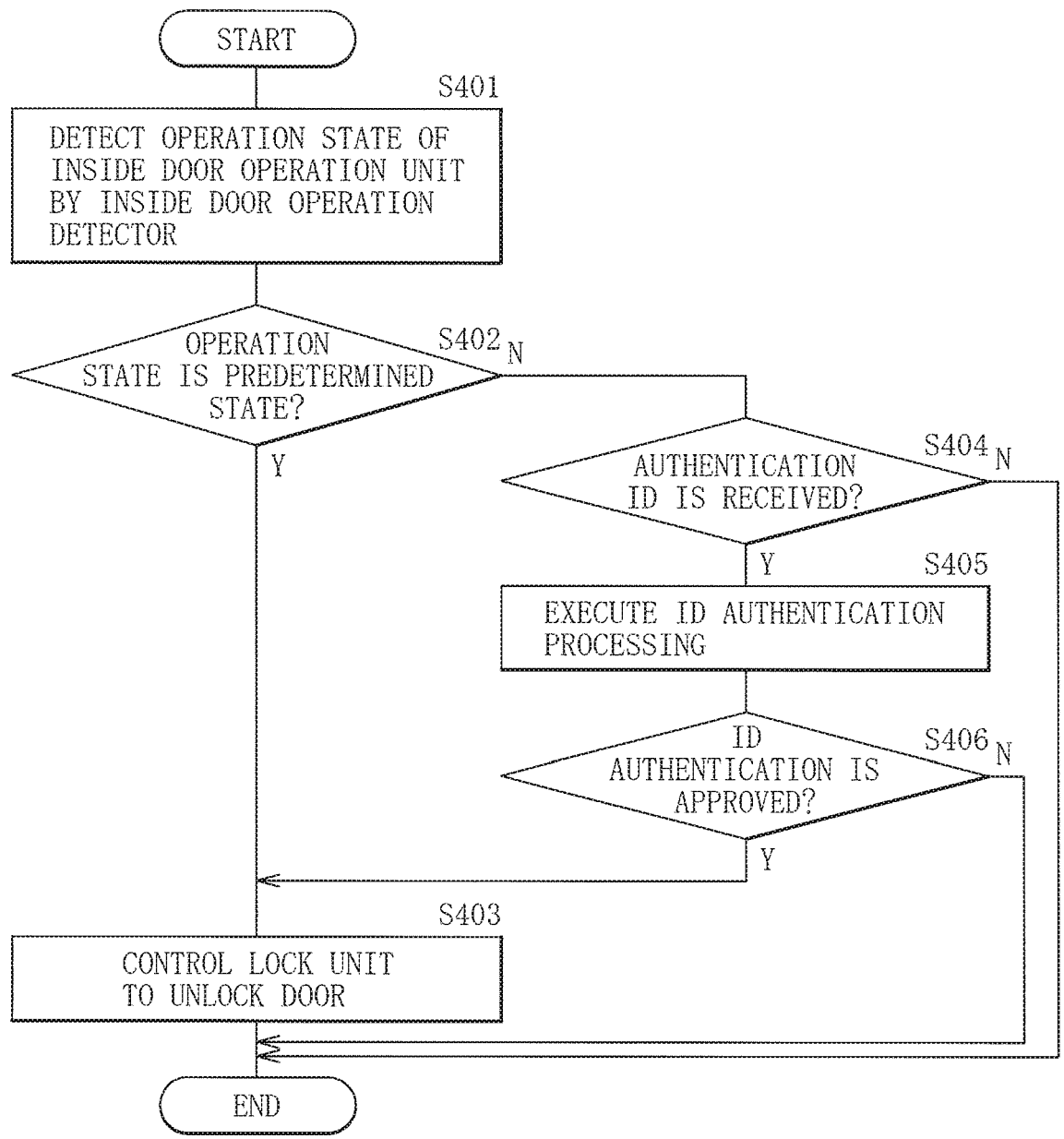

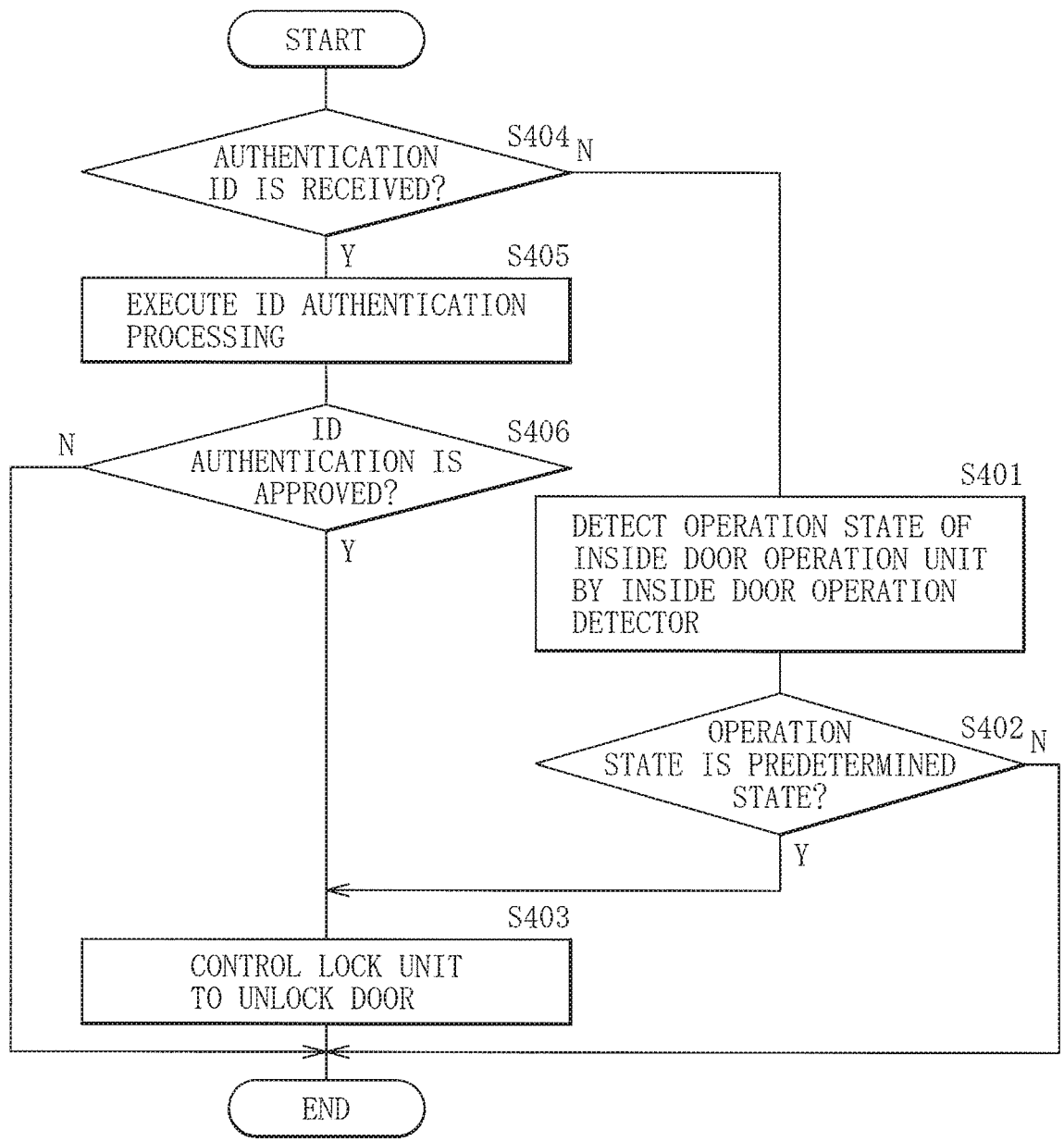
[FIG. 13]

[FIG. 14]
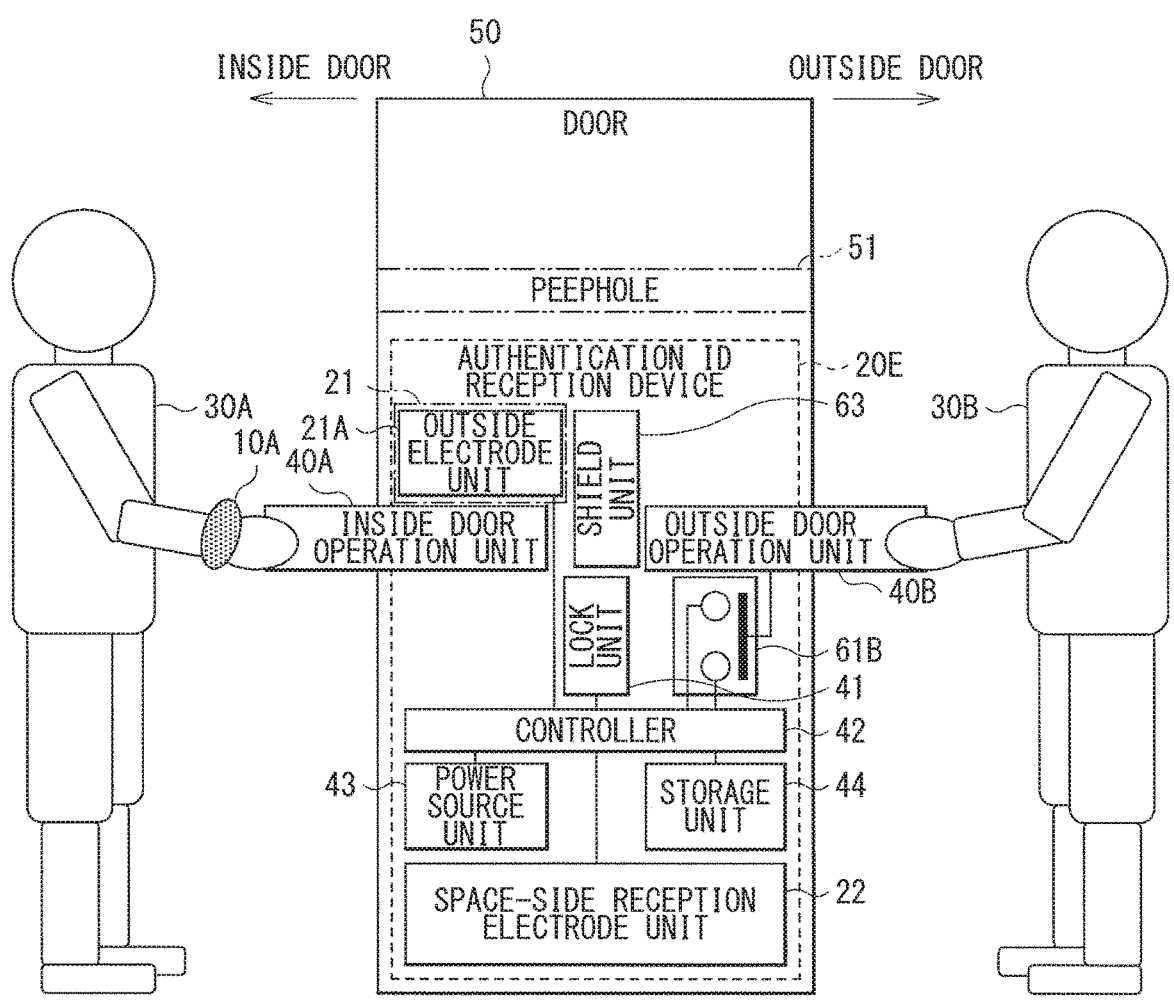

OPENING-CLOSING CONTROL DEVICE, OPENING-CLOSING CONTROL METHOD, AND OPENING-CLOSING CONTROL SYSTEM

TECHNICAL FIELD

The present disclosure relates to an opening-closing control device, an opening-closing control method, and an opening-closing control system that are suitable for door opening-closing control, for example.

BACKGROUND ART

As a communication system including a transmission device, a communication medium, and a reception device, communication technology using a human body as a communication medium is specifically called BAN (Body Area Network), HBC (Human Body Communication), IBC (Intra-body Communication), human body communication, quasi-electrostatic field communication, etc. (which are hereinafter referred to as BAN or human body communication). In the BAN, a user holds a transmission device including a human body-side transmission electrode and a space-side transmission electrode. In this case, the user holds the transmission device so that the human body-side transmission electrode is in closer proximity to a human body than the space-side transmission electrode. The reception device includes a human body-side reception electrode and a space-side reception electrode. The human body-side reception electrode receives a signal through a communication path using a human body as a communication medium with the human body-side transmission electrode, and the space-side reception electrode receives a signal through a communication path using space as a communication medium. In the BAN, it is possible to perform communication only by the user touching the reception electrode. The BAN is expected to be used, for example, in a security field in which unlocking of a door, and the like are performed.

CITATION LIST

Patent Literature

PTL 1: Japanese Unexamined Patent Application Publication No. 2011-205319

SUMMARY OF THE INVENTION

In the BAN, even if a human does not touch the human body-side reception electrode, there is a possibility that only approach of the human to the human body-side reception electrode or the space-side reception electrode causes unintended communication. Accordingly, in a case where the BAN is used in, for example, a door security field, there is a possibility that unintended locking or unintended unlocking is performed.

It is desirable to provide an opening-closing control device, an opening-closing control method, and an opening-closing control system that allow for reduction in erroneous locking and erroneous unlocking.

An opening-closing control device according to an embodiment of the present disclosure includes: a first electrode unit and a second electrode unit that perform communication with an authenticated communication device; an authentication processor that performs authentication processing on the authenticated communication device on the basis of a result of the communication with the authenticated communication device; an opening-closing operation unit that performs an operation on a lockable opening-closing unit; an operation detector that detects an operation state of the opening-closing operation unit; and a controller that locks or unlocks the opening-closing unit on the basis of a result of the authentication processing and a result of detection of the operation state.

An opening-closing control method according to an embodiment of the present disclosure includes: performing communication, through a first electrode unit and a second electrode unit provided in an authentication communication device, between the authentication communication device and an authenticated communication device; performing authentication processing on the authenticated communication device on the basis of a result of the communication between the authentication communication device and the authenticated communication device; detecting an operation state of an opening-closing operation unit that performs an operation on a lockable opening-closing unit; and locking or unlocking the opening-closing unit on the basis of a result of the authentication processing and a result of detection of the operation state.

An opening-closing control system according to an embodiment of the present disclosure includes an authenticated communication device and an authentication communication device that performs authentication processing on the authenticated communication device, and the authentication communication device includes: a first electrode unit and a second electrode unit that perform communication with an authenticated communication device; an authentication processor that performs authentication processing on the authenticated communication device on the basis of a result of the communication with the authenticated communication device; an opening-closing operation unit that performs an operation on a lockable opening-closing unit; an operation detector that detects an operation state of the opening-closing operation unit; and a controller that locks or unlocks the opening-closing unit on the basis of a result of the authentication processing and a result of detection of the operation state.

In the opening-closing control device, the opening-closing control method, or the opening-closing control system according to the embodiment of the present disclosure, the opening-closing unit is locked or unlocked on the basis of the result of the authentication processing on the authenticated communication device and the result of detection of the operation state of the opening-closing operation unit.

According to the opening-closing control device, the opening-closing control method, or the opening-closing control system according to the embodiment of the present disclosure, the opening-closing unit is locked or unlocked on the basis of the result of the authentication processing on the authenticated communication device and the result of detection of the operation state of the opening-closing operation unit, which makes it possible to reduce erroneous locking and erroneous unlocking.

It is to be noted that effects described here are not necessarily limited and may include any of effects described in the present disclosure.

BRIEF DESCRIPTION OF THE DRAWINGS

FIG. 1 is a configuration diagram illustrating an overview of a communication system using a human body as a communication medium.

FIG. 2 is a diagram illustrating a configuration example of an authentication communication system according to a comparative example of a first embodiment of the present disclosure.

FIG. 3 is a diagram illustrating a configuration example of an authentication communication system according to the first embodiment of the present disclosure.

FIG. 4 is a flow chart illustrating a first example of a control operation of the authentication communication system according to the first embodiment.

FIG. 5 is a flow chart illustrating a second example of the control operation of the authentication communication system according to the first embodiment.

FIG. 6 is a diagram illustrating a configuration example of an authentication communication system according to a comparative example of a second embodiment.

FIG. 7 is a diagram illustrating a configuration example of an authentication communication system according to the second embodiment.

FIG. 8 is a flow chart illustrating an example of a control operation of the authentication communication system according to the second embodiment.

FIG. 9 is a diagram illustrating a configuration example of an authentication communication system according to a third embodiment.

FIG. 10 is a flow chart illustrating an example of a control operation of the authentication communication system according to the third embodiment.

FIG. 11 is a diagram illustrating a configuration example of an authentication communication system according to a fourth embodiment.

FIG. 12 is a flow chart illustrating a first example of a control operation of the authentication communication system according to the fourth embodiment.

FIG. 13 is a flow chart illustrating a second example of the control operation of the authentication communication system according to the fourth embodiment.

FIG. 14 is a diagram illustrating a configuration example of an authentication communication system according to a modification example of the fourth embodiment.

MODES FOR CARRYING OUT THE INVENTION

In the following, some embodiments of the present disclosure are described in detail with reference to the drawings. It is to be noted that description is given in the following order.

1. First Embodiment (authentication communication system in which unlocking is performed only in a case where a holder of an authentication ID transmission device performs a predetermined door operation)
 1.1 Overview of Communication System Using Human Body as Communication Medium (FIG. 1)
 1.2 Comparative Example (FIG. 2)
 1.3 Configuration of Authentication Communication System according to First Embodiment (FIG. 3)
 1.4 Control Operation of Authentication Communication System according to First Embodiment (FIGS. 4 and 5)
 1.5 Effects
2. Second Embodiment (authentication communication system in which unlocking is performed only in a case where a holder of an authentication ID transmission device performs a predetermined door operation)
 2.1 Comparative Example (FIG. 6)
 2.2 Configuration of Authentication Communication System according to Second Embodiment (FIG. 7)
 2.3 Control Operation of Authentication Communication System according to Second Embodiment (FIG. 8)
3. Third Embodiment (authentication communication system in which selective switching between electrode units is performed in accordance with a predetermined door operation by a holder of an authentication ID transmission device)
 3.1 Configuration of Authentication Communication System according to Third Embodiment (FIG. 9)
 3.2 Control Operation of Authentication Communication System according to Third Embodiment (FIG. 10)
4. Fourth Embodiment (authentication communication system in which human body communication is enabled only from one of inside and outside a door)
 4.1 Configuration of Authentication Communication System according to Fourth Embodiment (FIG. 11)
 4.2 Control Operation of Authentication Communication System according to Fourth Embodiment (FIGS. 12 and 13)
 4.3 Modification Example of Fourth Embodiment (FIG. 14)
5. Other Embodiments

First Embodiment

1.1 Overview of Communication System Using Human Body as Communication Medium FIG. 1 illustrates an overview of a communication system using a human body as a communication medium.

The communication system 1 includes a transmission device 10 and a reception device 20.

The transmission device 10 includes a human body-side transmission electrode unit 11, a space-side transmission electrode unit 12, and a transmitter 13.

The reception device 20 includes a human body-side reception electrode unit 21, a space-side reception electrode unit 22, and a receiver 23.

An input signal serving as an origin of a transmission signal is inputted to the transmitter 13. The transmitter 13 generates a transmission signal including a signal modulated by a predetermined modulation system between the human body-side transmission electrode unit 11 and the space-side transmission electrode unit 12. The human body-side transmission electrode unit 11 is disposed on a side closer to a human body than the space-side transmission electrode unit 12. Hence, the human body-side transmission electrode unit 11 is disposed so as to have stronger electrostatic coupling to the communication medium 30 than the space-side transmission electrode unit 12.

In the communication system 1, approach of a portion of a human body closer to the human body-side reception electrode unit 21 than to the space-side reception electrode unit 22 causes a human body-side communication path 31 using the human body as the communication medium 30 to be formed between the human body-side transmission electrode unit 11 and the human body-side reception electrode unit 21. Moreover, a space-side communication path 32 using space (for example, air) as a communication medium is formed between the space-side transmission electrode unit 12 and the space-side reception electrode unit 22.

A potential difference corresponding to the transmission signal to be transmitted through the communication medium 30 is generated between the human body-side reception electrode unit 21 and the space-side reception electrode unit 22. The receiver 23 detects the potential difference generated between the human body-side reception electrode unit 21 and the space-side reception electrode unit 22, and performs demodulation processing corresponding to the modulation system of the transmitter 13 to convert the potential difference into a reception signal.

1.2 Comparative Example

FIG. 2 schematically illustrates a configuration example of an authentication communication system according to a comparative example of the first embodiment of the present disclosure.

The authentication communication system according to the comparative example illustrates an example in which the above-described communication system 1 is applied to an opening-closing control system for opening and closing of a door 50. The authentication communication system performs unlocking of the door 50, for example, in a case where an opening-closing person 30A inside the door 50 holds a predetermined authentication ID (identification) transmission device 10A as an authenticated communication device. The authentication ID transmission device 10A may be configured in a substantially similar manner to the transmission device 10 in the above-described communication system 1. The authentication ID transmission device 10A may include the human body-side transmission electrode unit 11, the space-side transmission electrode unit 12, and the transmitter 13, as with the transmission device 10 in the above-described communication system 1. The authentication ID transmission device 10A may be, for example, a mobile device typified by a smartphone, a mobile phone, and a camera. Alternatively, the authentication ID transmission device 10A may be a wearable device or an accessory device. The authentication ID transmission device 10A may be a portion of a device having a human body communication function or a dedicated device specific to the human body communication function.

It is to be noted that FIG. 2 illustrates an example of opening and closing from inside the door 50; however, the door 50 may be openable or closable from outside. In other words, in a case where an opening-closing person outside the door 50 holds the authentication ID transmission device 10A, the door 50 may be unlocked.

The door 50 has a peephole 51 provided with a cover 52. Moreover, the door 50 is provided with an authentication ID reception device 120 as an opening-closing control device. The authentication ID reception device 120 is an authentication communication device that performs authentication of the authentication ID transmission device 10A.

The authentication ID reception device 120 includes a door operation unit 40, a lock unit 41, a controller 42, a power source unit 43, and a storage unit 44.

The lock unit 41 performs locking of the door 50. The door operation unit 40 is an opening-closing operation unit that is operable by the inside opening-closing person 30A or an outside opening-closing person. The door operation unit 40 includes a doorknob, etc. The door operation unit 40 may have a shape that is partially protruded toward inside or outside the door 50.

The power source unit 43 supplies electric power to a portion where electric power is necessary such as the controller 42. The storage unit 44 holds authentication ID data necessary for authentication processing and program data necessary for various kinds of control, and the like.

The authentication ID reception device 120 corresponds to the reception device 20 in the above-described communication system 1, and includes the human body-side reception electrode unit 21 and the space-side reception electrode unit 22. The human body-side reception electrode unit 21 may be a first electrode unit that performs communication with the authentication ID transmission device 10A through the inside opening-closing person 30A or the outside opening-closing person serving as the communication medium 30. The space-side reception electrode unit 22 may be a second electrode unit that performs communication with the authentication ID transmission device 10A through space serving as a communication medium.

The human body-side reception electrode unit 21 is disposed at a center or a top in an internal portion of the door 50, for example. Moreover, the human body-side reception electrode unit 21 is provided at substantially a center in a thickness direction of the door 50, for example.

The space-side reception electrode unit 22 is disposed at a bottom in the internal portion of the door 50, for example. Moreover, the space-side reception electrode unit 22 is provided at substantially the center in the thickness direction of the door 50, for example.

The receiver 23 that is similar to that of the reception device 20 in the above-described communication system 1 may be provided within the controller 42. Note that the receiver 23 may be provided outside the controller 42, and the receiver 23 and the controller 42 may be communicably coupled to each other.

The controller 42 has a function as an authentication processor that performs authentication processing on the authentication ID transmission device 10A on the basis of a result of communication with the authentication ID transmission device 10A. Moreover, the controller 42 has a function as a controller that controls the lock unit 41 on the basis of a result of the authentication processing to lock or unlock the door 50. The controller 42 controls the lock unit 41 to unlock the door 50 in a case where the authentication of the authentication ID transmission device 10A is approved.

In the authentication communication system according to the comparative example, if the opening-closing person 30A inside the door 50 or the opening-closing person outside the door 50 who is holding the authentication ID transmission device 10A approaches the door 50, the authentication processing on the authentication ID transmission device 10A is performed, and in a case where authentication is approved, the lock unit 41 is controlled to unlock the door 50. Thus, the inside opening-closing person 30A or the outside opening-closing person is allowed to operate the door operation unit 40 to open or close the door 50.

In the authentication communication system according to the comparative example, just approach, to the door 50, of the inside opening-closing person 30A or the outside opening-closing person holding the authentication ID transmission device 10A causes communication for the authentication processing to be established, thereby unlocking the door 50. Hence, there is a possibility that the door 50 is unintentionally unlocked. For example, as illustrated in FIG. 2, even in a case where the inside opening-closing person 30A holding the authentication ID transmission device 10A approaches the door 50 to just see through the peephole 51 from inside the door 50 without intention to open the door 50, there is a possibility that the door 50 is unlocked.

1.3 Configuration of Authentication Communication System According to First Embodiment FIG. 3 schematically illustrates a configuration example of an authentication communication system according to the first embodiment of the present disclosure.

It is to be noted that in the following, components substantially same as components of the authentication communication system according to the comparative example in FIG. 2 are denoted by same reference numerals, and description thereof is omitted as appropriate.

For example, in a case where the opening-closing person 30A inside the door 50 holds the predetermined authentication ID transmission device 10A as an authenticated communication device, the authentication communication system according to the present embodiment enables unlocking of the door 50 as an opening-closing unit, as with the authentication communication system according to the comparative example in FIG. 2. However, unlike the comparative example, unlocking is not enabled just by holding the predetermined authentication ID transmission device 10A, and unlocking is enabled only in a case where a person holding the authentication ID transmission device 10A performs a predetermined door operation.

It is to be noted that FIG. 3 illustrates an example of opening and closing from inside the door 50; however, the door 50 may be openable or closable from outside. In other words, in a case where an opening-closing person outside the door 50 holds the authentication ID transmission device 10A and performs the predetermined door operation, unlocking of the door 50 may be enabled.

The door 50 includes the authentication ID reception device 20A as an opening-closing control device. The authentication ID reception device 20A is an authentication communication device that performs authentication of the authentication ID transmission device 10A.

The authentication ID reception device 20A includes a door operation unit 40, the lock unit 41, the controller 42, the power source unit 43, and the storage unit 44. The authentication ID reception device 20A further includes a door detector 60, a door operation detector 61, and a pressed unit 62.

The door detector 60 is an opening-closing detector that detects an opening-closing state of the door 50. The door detector 60 includes, for example, a pressure sensor. The door detector 60 detects whether or not the pressed unit 62 is pressed, which makes it possible to detect the opening-closing state of the door 50.

The door operation detector 61 is an operation detector that detects an operation state of the door operation unit 40 in accordance with the door operation unit 40. The door operation detector 61 includes, for example, a pressure sensor. The door operation detector 61 may be, for example, a sensor that detects pressure in accordance with the operation state of the door operation unit 40, such as turning of the door operation unit 40 and pushing or pulling of the door operation unit 40.

It is to be noted that the door detector 60 and the door operation detector 61 may include a sensor other than the pressure sensor. Moreover, the pressed unit 62 of the door detector 60 may be omitted from the configuration.

The door detector 60 and the door operation detector 61 may include a contact sensor. Specifically, for example, the door operation detector 61 may include a sensor that detects approach or contact of an object by change in capacitance with respect to the door operation unit 40, or the like.

The door detector 60 and the door operation detector 61 may include a position sensor. Specifically, for example, the door operation detector 61 may include a sensor that detects position information of the door operation unit 40 by a GNSS (Global Navigation Satellite System), a GPS (Global Positioning System), or the like.

The door detector 60 and the door operation detector 61 may include an angle sensor. Specifically, for example, the door operation detector 61 may include a sensor that detects angle information of the door operation unit 40 by magnetic change, etc.

The door detector 60 and the door operation detector 61 may include a light amount sensor. Specifically, for example, the door operation detector 61 may include a sensor that detects, by change in light amount, or the like, that the door operation unit 40 is shielded.

The door detector 60 and the door operation detector 61 may include a temperature sensor. Specifically, for example, the door operation detector 61 may include a sensor that detects change in temperature of the door operation unit 40 by a thermocouple, a thermistor, an infrared camera, etc.

The door detector 60 and the door operation detector 61 may include an imaging sensor. Specifically, for example, the door operation detector 61 may include a sensor that detects an operation of the door operation unit 40 by an imaging device, etc.

In the present embodiment, the controller 42 controls the lock unit 41 on the basis of a result of the authentication processing on the authentication ID transmission device 10A, and a result of detection of the operation state by the door operation detector 61 to lock or unlock the door 50. In a case where authentication of the authenticated communication device 10A is approved, and a predetermined state is detected as an operation state, the controller 42 controls the lock unit 41 to unlock the door 50. The predetermined state in this case is, for example, a state in which an operation of opening the door 50 such as pulling or turning the door operation unit 40.

The door operation detector 61 starts detection of the operation state of the door operation unit 40 after the authentication of the authentication ID transmission device 10A is approved. Alternatively, the door operation detector 61 may start detection of the operation state of the door operation unit 40 before performing the authentication processing on the authenticated communication device 10A.

The controller 42 controls the lock unit 41 on the basis of a detection result by the door detector 60 to lock the door 50. For example, in a case where the door detector 60 detects that the door 50 is closed, the controller 42 controls the lock unit 41 to lock the door 50.

Other configurations may be substantially similar to those in the authentication communication system according to the above-described comparative example.

1.4 Control Operation of Authentication Communication System According to First Embodiment

First Example of Control Operation

FIG. 4 illustrates a first example of a control operation of the authentication communication system according to the present embodiment.

First, the controller 42 determines whether or not an authentication ID is received from the authentication ID transmission device 10A (step S100). In a case where the controller 42 determines that the authentication ID is not received (step S100; N), the controller 42 is turned to an authentication ID reception standby state.

In a case where the controller 42 determines that the authentication ID is received (step S100; Y), the controller 42 executes ID authentication processing (step S101). Next, the controller 42 determines whether or not the ID authentication is approved (step S102). In a case where the controller 42 determines that the ID authentication is not approved (step S102; N), the controller 42 goes to processing in step S106 to be described later.

In a case where the controller 42 determines that the ID authentication is approved (step S102; Y), the controller 42 next detects the operation state of the door operation unit 40 with use of the door operation detector 61 (step S103). Thereafter, the controller 42 determines whether or not the operation state of the door operation unit 40 is the predetermined state (step S104). In a case where the controller 42 determines that the operation state is not the predetermined state (step S104; N), the controller 42 goes to the processing in step S106 to be described later.

In a case where the controller 42 determines that the operation state is the predetermined state (step S104; Y), the controller 42 controls the lock unit 41 to unlock the door 50 (step S105). Thereafter, the controller 42 detects the opening-closing state of the door 50 with use of the door detector 60 (step S106).

Next, the controller 42 determines whether or not the door 50 is closed on the basis of a detection result by the door detector 60 (step S107). In a case where the controller 42 determines that the door 50 is not closed (step S107; N), the controller 42 is on standby for a predetermined time (step S108), and thereafter gives a warning indicating that the door 50 is opened (step S109), and goes to the processing in the step S106. The warning here is given by an unillustrated display unit, an unillustrated audio unit, etc., for example. Alternatively, for example, notification of the warning may be provided to an external management device through an unillustrated communication unit.

In contrast, in a case where the controller 42 determines that the door 50 is closed (step S107; Y), the controller 42 next detects the state of the lock unit 41 (step S110), and determines whether or not the lock unit 41 is in an unlocked state (step S111). In a case where the controller 42 determines that the lock unit 41 is not in the unlocked state (step S111; N), the controller 42 ends the processing. In a case where the controller 42 determines that the lock unit 41 is in the unlocked state (step S111; Y), the controller 42 controls the lock unit 41 to lock the door 50 (step S112).

Second Example of Control Operation

In the control operation in FIG. 4, after authentication of the authentication ID transmission device 10A is approved, detection of the operation state of the door operation unit 40 by the door operation detector 61 starts; however, detection of the operation state of the door operation unit 40 may start before performing the authentication processing on the authenticated communication device 10A. The controller 42 may perform the authentication processing in a case where the predetermined state is detected as the operation state of the door operation unit 40. Thus, the authentication processing is performed only in a case where the operation state of the door operation unit 40 is the predetermined state; which makes it possible to achieve reduction in power consumption.

Specifically, a control operation as illustrated in FIG. 5 may be performed. In the control operation illustrated in FIG. 5, the order of the processing in the steps S100 to S102 and the processing in the steps S103 and S104 in the control operation in FIG. 4 are changed.

More specifically, first, the controller 42 may detect the operation state of the door operation unit 40 with use of the door operation detector 61 (step S103). Next, the controller 42 may determine whether or not the operation state of the door operation unit 40 is the predetermined state (step S104). In a case where the controller 42 determines that the operation state is not the predetermined state (step S104; N), the controller 42 may go to the processing in the step S106.

In a case where the controller 42 determines that the operation state is the predetermined state (step S104; Y), the controller 42 may determine whether or not the authentication ID is received from the authentication ID transmission device 10A (step S100). In a case where the controller 42 determines that the authentication ID is not received (step S100; N), the controller 42 may go to the processing in the step S106. In a case where the controller 42 determines that the authentication ID is received (step S100; Y), the controller 42 may execute the ID authentication processing (step S101). Next, the controller 42 may determine whether or not the ID authentication is approved (step S102). In a case where the controller 42 determines that the ID authentication is not approved (step S102; N), the controller 42 may go to the processing in the step S106. In a case where the controller 42 determines that the ID authentication is approved (step S102; Y), the controller 42 may next control the lock unit 41 to unlock the door 50 (step S105). Thereafter, the controller 42 may detect the opening-closing state of the door 50 with use of the door detector 60 (step S106). The processing in the step S106 and the subsequent steps may be substantially similar to that in the control operation in FIG. 4.

It is to be noted that control flows illustrated in FIGS. 4 and 5 are merely examples. A control flow from which some of respective processing steps illustrated in FIGS. 4 and 5 are omitted may be executed. Alternatively, a control flow to which another processing step not illustrated in FIGS. 4 and 5 is added may be executed. Alternatively, a control flow in which the order of the respective processing steps illustrated in FIGS. 4 and 5 are partially changed may be executed.

1.5 Effects

As described above, according to the present embodiment, the door 50 is locked or unlocked on the basis of a result of the authentication processing on the authentication ID transmission device 10A and a result of detection of the operation state of the door operation unit 40, which makes it possible to reduce erroneous locking and erroneous unlocking. For example, it is possible to reduce, for example, unintended erroneous unlocking and unintended erroneous locking such as locking or unlocking of the door 50 without intention to lock or unlock the door 50.

According to the present embodiment, the authentication processing or detection of the operation state by the door operation detector 61 is performed only under a predetermined condition, which makes it possible to perform a system operation with minimum power consumption.

Moreover, for example, in technology described in PTL 1 (Japanese Unexamined Patent Application Publication No. 2011-205319), design and external appearance related to the door 50 are restricted. In contrast, according to the present embodiment, a system construction is enabled only by processing on the internal portion of the door 50 and component replacement without restricting the design and the external appearance. According to the present embodiment, it is not necessary to replace the entire door 50 for the system construction, and a low-cost system construction is enabled only by processing on the existing door 50 and component exchange.

It is to be noted that the effects described in the description are merely illustrative and non-limiting, and other effects may be included. This applies to effects achieved by the following other embodiments.

2. Second Embodiment

Next, description is given of an authentication communication system according to a second embodiment of the present disclosure. It is to be noted that components substantially same as those of the authentication communication system according to the foregoing first embodiment are denoted by same reference numerals, and description thereof is omitted as appropriate.

2.1 Comparative Example

FIG. 6 schematically illustrates a configuration example of an authentication communication system according to a comparative example of the second embodiment of the present disclosure.

A configuration of the authentication communication system according to the comparative example illustrated in FIG. 6 is similar to the configuration of the authentication communication system according to the comparative example of the foregoing first embodiment illustrated in FIG. 2.

In the authentication communication system according to the comparative example illustrated in FIG. 6, for example, just approach, to the door 50, of the inside opening-closing person 30A holding the authentication ID transmission device 10A causes communication for authentication processing to be established, thereby unlocking the door 50. Hence, even in a case where the inside opening-closing person 30A does not intend to unlock the door 50, there is a possibility that an outside opening-closing person 30B not holding the authentication ID transmission device 10A is allowed to open the door 50. For example, as illustrated in FIG. 6, even in a case where the inside opening-closing person 30A holding the authentication ID transmission device 10A approaches the door 50 to just see through the peephole 51 from inside the door 50 without intention to open the door 50, there is a possibility that the door 50 is unlocked and the outside opening-closing person 30B not holding the authentication ID transmission device 10A is allowed to open the door 50.

For this reason, in the present embodiment, there is provided an authentication communication system that enables unlocking of the door 50 only in a case where a holder of the authentication ID transmission device 10A performs a predetermined door operation at a predetermined position.

2.2 Configuration of Authentication Communication System According to Second Embodiment FIG. 7 schematically illustrates a configuration example of the authentication communication system according to the second embodiment of the present disclosure.

The door 50 includes an authentication ID reception device 20B as an opening-closing control device. The authentication ID reception device 20B is an authentication communication device that performs authentication of the authentication ID transmission device 10A.

The authentication ID reception device 20B includes the door operation unit 40 in the authentication communication system according to the foregoing first embodiment. The door operation unit 40 includes an inside door operation unit 40A and an outside door operation unit 40B.

The inside door operation unit 40A is an inside opening-closing operation unit that allows the inside opening-closing person 30A to operate the door 50 from inside, and includes a doorknob, etc. The inside door operation unit 40A may have a shape that is partially protruded toward inside the door 50. The outside door operation unit 40B is an outside opening-closing operation unit that allows the outside opening-closing person 30B to operate the door 50 from outside, and includes a doorknob, etc. The outside door operation unit 40B may have a shape that is partially protruded toward outside the door 50.

Moreover, the door operation detector 61 in the authentication communication system according to the foregoing first embodiment includes an inside door operation detector 61A and an outside door operation detector 61B.

The inside door operation detector 61A is an inside operation detector that detects an operation state of the inside door operation unit 40A in accordance with a configuration of the inside door operation unit 40A. The inside door operation detector 61A includes, for example, a pressure sensor. The inside door operation detector 61A may be, for example, a sensor that detects pressure in accordance with the operation state of the inside door operation unit 40A such as turning of the inside door operation unit 40A and pushing or pulling of the inside door operation unit 40A.

The outside door operation detector 61B is an outside operation detector that detects an operation state of the outside door operation unit 40B in accordance with a configuration of the outside door operation unit 40B. The outside door operation detector 61B includes, for example, a pressure sensor. The outside door operation detector 61B may be, for example, a sensor that detects pressure in accordance with the operation state of the outside door operation unit 40B such as turning of the outside door operation unit 40B and pushing or pulling of the outside door operation unit 40B.

It is to be noted that the inside door operation detector 61A and the outside door operation detector 61B may include a sensor other than the pressure sensor, as with the door operation detector 61 in the authentication communication system according to the foregoing first embodiment. For example, as described above, the inside door operation detector 61A and the outside door operation detector 61B may include a contact sensor, a position sensor, etc.

The human body-side reception electrode unit 21 is divided into an inside electrode unit 21A and an outside electrode unit 21B. The outside electrode unit 21B is desirably provided closer to outside than a position of the inside electrode unit 21A in the thickness direction in the door 50. For example, the inside electrode unit 21A is desirably provided closer to inside than a central position in the thickness direction in the door 50. In this case, the outside electrode unit 21B is desirably provided closer to outside than the central position in the thickness direction in the door 50.

The inside door operation unit 40A and the outside door operation unit 40B are desirably electrically insulated from each other. Moreover, the inside electrode unit 21A and the outside electrode unit 21B are desirably electrically insulated from each other. In order to reliably electrically insulate these units from each other, a shield unit 63 is desirably provided between the inside door operation unit 40A and the outside door operation unit 40B and between the inside electrode unit 21A and the outside electrode unit 21B. At least a portion of the shield unit 63 may be provided between the inside door operation unit 40A and the outside door operation unit 40B or between the inside electrode unit 21A and the outside electrode unit 21B. For example, the shield unit 63 may have a shape that extends to a portion other than a portion between the inside door operation unit 40A and the outside door operation unit 40B and a portion between the inside electrode unit 21A and the outside electrode unit 21B. Moreover, the shield unit 63 may have a shape that partially extends outward from the door 50.

In the present embodiment, the controller 42 causes one of the inside door operation detector 61A and the outside door operation detector 61B to detect an operation state on the basis of a signal related to a received voltage of the inside electrode unit 21A and a signal related to a received voltage of the outside electrode unit 21B. More specifically, the controller 42 may perform comparison between a first signal value related to the received voltage of the inside electrode unit 21A (for example, a received voltage value V1 of the inside electrode unit 21A) and a second signal value related to the received voltage of the outside electrode unit 21B (for example, a received voltage value V2 of the outside electrode unit 21B), and, in a case where the first signal value is larger, the controller 42 may cause the inside door operation detector 61A to detect an operation state of the inside door operation unit 40A. Moreover, in a case where the second signal value is larger, the controller 42 may cause the outside door operation detector 61B to detect an operation state of the outside door operation detector 61B. It is to be noted that the signal value related to the received voltage may be signal intensity or a RSSI (Received Signal Strength Indicator). Alternatively, the signal value related to the received voltage may be an electric power value or a current value.

It is to be noted that the controller 42 may switch between detection of a reception signal by the inside electrode unit 21A and detection of a reception signal by the outside electrode unit 21B in a time division manner. Moreover, the shield unit 63 between the inside door operation unit 40A and the outside door operation unit 40B and between the inside electrode unit 21A and the outside electrode unit 21B may be omitted from the configuration.

Other configurations are substantially similar to those of the authentication communication system according to the foregoing first embodiment.

2.3 Control Operation of Authentication Communication System According to Second Embodiment FIG. 8 illustrates an example of a control operation of the authentication communication system according to the second embodiment. It is to be noted that a control flow illustrated in FIG. 8 is merely an example. A control flow from which some of respective processing steps illustrated in FIG. 8 are omitted may be executed. Alternatively, a control flow to which another processing step not illustrated in FIG. 8 is added may be executed. Alternatively, a control flow in which the order of the respective processing steps illustrated in FIG. 8 is partially changed may be executed.

First, the controller 42 determines whether or not the authentication ID is received from the authentication ID transmission device 10A (step S200). In a case where the controller 42 determines that the authentication ID is not received (step S200; N), the controller 42 is turned to the authentication ID reception standby state.

In a case where the controller 42 determines that the authentication ID is received (step S200; Y), the controller 42 executes the ID authentication processing (step S201).

Next, the controller 42 determines whether or not the ID authentication is approved (step S202). In a case where the controller 42 determines that the ID authentication is not approved (step S202; N), the controller 42 ends the processing.

In a case where the controller 42 determines that the ID authentication is approved (step S202; Y), the controller 42 next measures the received voltage value V1 of the inside electrode unit 21A and the received voltage value V2 of the outside electrode unit 21B (step S203).

Next, the controller 42 determines whether or not a difference (V1–V2) of the received voltage value V2 of the outside electrode unit 21B from the received voltage value V1 of the inside electrode unit 21A exceeds a predetermined threshold value (step S204).

In a case where the controller 42 determines that the difference (V1–V2) exceeds the predetermined threshold value (step S204; Y), the controller 42 next causes the inside door operation detector 61A to detect the operation state of the inside door operation unit 40A (step S205). Subsequently, the controller 42 determines whether or not the operation state of the inside door operation unit 40A is a predetermined state (step S206). In a case where the controller 42 determines that the operation state of the inside door operation unit 40A is not the predetermined state (step S206; N), the controller 42 ends the processing. In a case where the controller 42 determines that the operation state of the inside door operation unit 40A is the predetermined state (step S206; Y), the controller 42 controls the lock unit 41 to unlock the door (step S207).

In contrast, in a case where the controller 42 determines that the difference (V1–V2) does not exceed the predetermined threshold value (step S204; N), the controller 42 next determines whether or not a difference (V2–V1) of the received voltage value V1 of the inside electrode unit 21A from the received voltage value V2 of the outside electrode unit 21B exceeds a predetermined threshold value (step S208). In a case where the controller 42 determines that the difference (V2–V1) does not exceed the predetermined threshold value (step S208; N), the controller 42 ends the processing. In a case where the controller 42 determines that the difference (V2–V1) exceeds the predetermined threshold value (step S208; Y), the controller 42 next causes the outside door operation detector 61B to detect the operation state of the outside door operation unit 40B (step S209). Subsequently, the controller 42 determines whether or not the operation state of the outside door operation unit 40B is a predetermined state (step S210). In a case where the controller 42 determines that the operation state of the outside door operation unit 40B is not the predetermined state (step S210; N), the controller 42 ends the processing. In a case where the controller 42 determines that the operation state of the outside door operation unit 40B is the predetermined state (step S210; Y), the controller 42 controls the lock unit 41 to unlock the door 50 (step S211).

As described above, in the authentication communication system according to the present embodiment, it is possible to more reliably avoid unintended erroneous unlocking such as unlocking of the door 50 without intention to unlock the door 50.

Other operations and effects may be substantially similar to those of the authentication communication system according to the foregoing first embodiment.

3. Third Embodiment

Next, description is given of an authentication communication system according to a third embodiment of the present disclosure. It is to be noted that components substantially same as those of the authentication communication system according to the foregoing first or second embodiment are denoted by same reference numerals, and description thereof is omitted as appropriate.

3.1 Configuration of Authentication Communication System According to Third Embodiment FIG. 9 schematically illustrates a configuration example of the authentication communication system according to the third embodiment of the present disclosure.

The door 50 includes an authentication ID reception device 20C as an opening-closing control device. The authentication ID reception device 20C is an authentication communication device that performs authentication of the authentication ID transmission device 10A.

The authentication ID reception device 20C includes the inside door operation unit 40A, the outside door operation unit 40B, the inside door operation detector 61A, and the outside door operation detector 61B in a substantially similar manner to the authentication ID reception device 20B in the authentication communication system according to the foregoing second embodiment. Moreover, the authentication ID reception device 20C includes the inside electrode unit 21A and the outside electrode unit 21B in a substantially similar manner to the authentication ID reception device 20B.

The authentication ID reception device 20C further includes a selector 45. In the present embodiment, it is possible to select, by the selector 45, one of the inside electrode unit 21A and the outside electrode unit 21B through which communication is to be performed. For example, in a case where the operation state of the inside door operation unit 40A is turned to the predetermined state, it is possible to select the inside electrode unit 21A by the selector 45, and in a case where the operation state of the outside door operation unit 40B is turned to the predetermined state, it is possible to select the outside electrode unit 21B by the selector 45.

The controller 42 performs the authentication processing on the authentication ID transmission device 10A on the basis of a result of communication through one electrode unit selected, by the selector 45, from the inside electrode unit 21A and the outside electrode unit 21B.

Other configurations may be substantially similar to those in the authentication communication system according to the foregoing first or second embodiment.

3.2 Control Operation of Authentication Communication System According to Third Embodiment FIG. 10 illustrates an example of a control operation of the authentication communication system according to the third embodiment. It is to be noted that a control flow illustrated in FIG. 10 is merely an example. A control flow from which some of respective processing steps illustrated in FIG. 10 are omitted may be executed. Alternatively, a control flow to which another processing step not illustrated in FIG. 10 is added may be executed. Alternatively, a control flow in which the order of the respective processing steps illustrated in FIG. 10 is partially changed may be executed.

The controller 42 performs processing for detecting the operation state of the inside door operation unit 40A by the inside door operation detector 61A or processing for detecting the operation state of the outside door operation unit 40B by the outside door operation detector 61B (step S300).

In a case where the operation state of the inside door operation unit 40A is detected by the inside door operation detector 61A (step S311), the controller 42 next determines whether or not the operation state of the inside door operation unit 40A is the predetermined state (step S312). In a case where the controller 42 determines that the operation state of the inside door operation unit 40A is not the predetermined state (step S312; N), the controller 42 ends the processing. In a case where the controller 42 determines that the operation state of the inside door operation unit 40A is the predetermined state (step S312; Y), the inside electrode unit 21A is selected by the selector 45 (step S313). Substantially, the controller 42 determines whether or not the authentication ID is received from the authentication ID transmission device 10A through the inside electrode unit 21A (step S314). In a case where the controller 42 determines that the authentication ID is not received (step S314; N), the controller 42 ends the processing. In a case where the controller 42 determines that the authentication ID is received (step S314; Y), the controller 42 executes the ID authentication processing (step S315). Next, the controller 42 determines whether or not the ID authentication is approved (step S316). In a case where the controller 42 determines that the ID authentication is not approved (step S316; N), the controller 42 ends the processing. In a case where the controller 42 determines that the ID authentication is approved (step S316; Y), the controller 42 next controls the lock unit 41 to unlock the door 50 (step S317).

In contrast, in a case where the operation state of the outside door operation unit 40B is detected by the outside door operation detector 61B (step S321), the controller 42 next determines whether or not the operation state of the outside door operation unit 40B is the predetermined state (step S322). In a case where the controller 42 determines that the operation state of the outside door operation unit 40B is not the predetermined state (step S322; N), the controller 42 ends the processing. In a case where the controller 42 determines that the operation state of the outside door operation unit 40B is the predetermined state (step S322; Y), the outside electrode unit 21B is selected by the selector 45 (step S323). Subsequently, the controller 42 determines whether or not the authentication ID is received from the authentication ID transmission device 10A through the outside electrode unit 21B (step S324). In a case where the controller 42 determines that the authentication ID is not received (step S324; N), the controller 42 ends the processing. In a case where the controller 42 determines that the authentication ID is received (step S324; Y), the controller 42 executes the ID authentication processing (step S325). Next, the controller 42 determines whether or not the ID authentication is approved (step S326). In a case where the controller 42 determines that the ID authentication is not approved (step S326; N), the controller 42 ends the processing. In a case where the controller 42 determines that the ID authentication is approved (step S326; Y), the controller 42 next controls the lock unit 41 to unlock the door 50 (step S327).

It is to be noted that in FIG. 10, an operation example in which one electrode unit of the inside electrode unit 21A and the outside electrode unit 21B is selected in accordance with the operation states of the inside door operation unit 40A and the outside door operation detector 61B; however, one electrode unit of the inside electrode unit 21A and the outside electrode unit 21B may be selected in a time division manner irrespective of the operation states.

As described above, in the authentication communication system according to the present embodiment, it is possible to more reliably avoid unintended erroneous unlocking such as unlocking of the door 50 without intention to unlock the door 50. Moreover, communication through one of the inside electrode unit 21A and the outside electrode unit 21B is selectable in a time division manner; which makes it possible to achieve reduction in power consumption for communication.

Other operations and effects may be substantially similar to those of the authentication communication system according to the foregoing first or second embodiment.

4. Fourth Embodiment

Next, description is given of an authentication communication system according to a fourth embodiment of the present disclosure. It is to be noted that components substantially same as those of the authentication communication system according to the foregoing first, second, or third embodiment are denoted by same reference numerals, and description thereof is omitted as appropriate.

4.1 Configuration of Authentication Communication System According to Fourth Embodiment FIG. 11 schematically illustrates a configuration example of the authentication communication system according to the fourth embodiment of the present disclosure. The authentication communication system according to the present embodiment illustrated in FIG. 11 enables human body communication only from outside out of inside and outside the door 50. The authentication communication system according to the present embodiment has a configuration in which human body communication is unnecessary for unlocking from inside the door 50 and human body communication is absolutely necessary for unlocking from outside the door 50.

The door 50 includes an authentication ID reception device 20D as an opening-closing control device. The authentication ID reception device 20D is an authentication communication device that performs authentication of the authentication ID transmission device 10A.

The authentication ID reception device 20D includes the door operation unit 40 in the authentication communication system according to the foregoing first embodiment. The door operation unit 40 includes the inside door operation unit 40A and the outside door operation unit 40B.

Moreover, the door operation detector 61 in the authentication communication system according to the foregoing first embodiment includes the inside door operation detector 61A.

Further, the human body-side reception electrode unit 21 includes the outside electrode unit 21B. The outside electrode unit 21B is desirably provided closer to outside than the central position in the thickness direction in the door 50. Note that as described later, in a case where the shield unit 63 is provided between a region inside the door 50 and the outside electrode unit 21B, the outside electrode unit 21B is not necessarily provided closer to outside than the central position in the thickness direction in the door 50.

The inside door operation unit 40A and the outside door operation unit 40B are desirably electrically insulated from each other. Moreover, the region inside the door 50 and the outside electrode unit 21B are desirably electrically insulated from each other. In order to reliably electrically insulating them from each other, the shield unit 63 is desirably provided between the inside door operation unit 40A and the outside door operation unit 40B and between the region inside the door 50 and the outside electrode unit 21B. At least a portion of the shield unit 63 may be provided between the inside door operation unit 40A and the outside door operation unit 40B or between the region inside the door 50 and the outside electrode unit 21B. At least a portion of the shield unit 63 is desirably provided closer to inside the door 50 than the outside electrode unit 21B. For example, the shield unit 63 may have a shape that extends to a portion other than a portion between the inside door operation unit 40A and the outside door operation unit 40B and a portion between the region inside the door 50 and the outside electrode unit 21B. Moreover, the shield unit 63 may have a shape that partially extends outward from the door 50.

Other configurations are substantially similar to those of the authentication communication system according to the foregoing first or second embodiment.

4.2 Control Operation of Authentication Communication System According to Fourth Embodiment

First Example of Control Operation

FIG. 12 illustrates a first example of a control operation of the authentication communication system according to the fourth embodiment. It is to be noted that a control flow illustrated in FIG. 12 is merely an example. A control flow from which some of respective processing steps illustrated in FIG. 12 are omitted may be executed. Alternatively, a control flow to which another processing step not illustrated in FIG. 12 is added may be executed. Alternatively, a control flow in which the order of the respective processing steps illustrated in FIG. 12 is partially changed may be executed.

First, the controller 42 detects the operation state of the inside door operation unit 40A with use of the inside door operation detector 61A (step S401). The controller 42 next determines whether or not the operation state of the inside door operation unit 40A is the predetermined state (step S402).

In a case where the controller 42 determines that the operation state of the inside door operation unit 40A is the predetermined state (step S402; Y), the controller 42 controls the lock unit 41 to unlock the door 50 (step S403).

In contrast, the controller 42 determines that the operation state of the inside door operation unit 40A is the predetermined state (step S402; N), the controller 42 next determines whether or not the authentication ID is received from the authentication ID transmission device 10A through the outside electrode unit 21B (step S404). In a case where the controller 42 determines that the authentication ID is not received (step S404; N), the controller ends the processing. In a case where the controller 42 determines that the authentication ID is received (step S404; Y), the controller executes the ID authentication processing (step S405). Next, the controller 42 determines whether or not the ID authentication is approved (step S406). In a case where the controller 42 determines that the ID authentication is not approved (step S406; N), the controller 42 ends the processing. In a case where the controller 42 determines that the ID authentication is approved (step S406; Y), the controller 42 next controls the lock unit 41 to unlock the door 50 (step S403).

Second Example of Control Operation

FIG. 13 illustrates a second example of the control operation of the authentication communication system according to the fourth embodiment. It is to be noted that a control flow illustrated in FIG. 13 is merely an example. A control flow from which some of respective processing steps illustrated in FIG. 13 are omitted may be executed. Alternatively, a control flow to which another processing step not illustrated in FIG. 13 is added may be executed. Alternatively, a control flow in which the order of the respective processing steps illustrated in FIG. 13 is partially changed may be executed.

In FIG. 13, processing steps corresponding to the processing steps in the control operation in FIG. 12 are denoted by same step numbers.

In the second example, first, the controller 42 determines whether or not the authentication ID is received from the authentication ID transmission device 10A through the outside electrode unit 21B (step S404). In a case where the controller 42 determines that the authentication ID is received (step S404; Y), the controller executes the ID authentication processing (step S405). Next, the controller 42 determines whether or not the ID authentication is approved (step S406). In a case where the controller 42 determines that the ID authentication is not approved (step S406; N), the controller 42 ends the processing. In a case where the controller 42 determines that the ID authentication is approved (step S406; Y), the controller 42 next controls the lock unit 41 to unlock the door 50 (step S403).

In contrast, in a case where the controller 42 determines that the authentication ID is not received (step S404; N), the controller 42 detects the operation state of the inside door operation unit 40A with use of the inside door operation detector 61A (step S401). The controller 42 next determines whether or not the operation state of the inside door operation unit 40A is the predetermined state (step S402). In a case where the controller 42 determines that the operation state of the inside door operation unit 40A is the predetermined state (step S402; Y), the controller 42 controls the lock unit 41 to unlock the door 50 (step S403). In a case where the controller 42 determines that the operation state of the inside door operation unit 40A is not the predetermined state (step S402; N), the controller 42 ends the processing.

As described above, in the authentication communication system according to the present embodiment, it is possible to more reliably avoid unintended erroneous unlocking such as unlocking of the door 50 without intention to unlock the door 50.

Other operations and effects may be substantially similar to those of the authentication communication system according to the foregoing first or second embodiment.

4.3 Modification Example of Fourth Embodiment

FIG. 14 schematically illustrates a configuration example of an authentication communication system according to a modification example of the fourth embodiment. The modification example illustrated in FIG. 14 has a configuration in which an inside configuration and an outside configuration are reversed with respect to the configuration example illustrated in FIG. 11. The authentication communication system according to the present modification example enables human body communication only from inside out of inside and outside the door 50. The authentication communication system according to the present modification example has a configuration in which human body communication is unnecessary for unlocking from outside the door 50 and human body communication is absolutely necessary for unlocking from inside the door 50.

The door 50 includes an authentication ID reception device 20E as an opening-closing control device. The authentication ID reception device 20E is an authentication communication device that performs authentication of the authentication ID transmission device 10A.

The authentication ID reception device 20E includes the door operation unit 40 in the authentication communication system according to the foregoing first embodiment. The door operation unit 40 includes the inside door operation unit 40A and the outside door operation unit 40B.

Moreover, the door operation detector 61 in the authentication communication system according to the foregoing first embodiment includes the outside door operation detector 61B.

Further, the human body-side reception electrode unit 21 includes the inside electrode unit 21A. The inside electrode unit 21A is desirably provided closer to inside than the central position in the thickness direction in the door 50. Note that as described later, in a case where the shield unit 63 is provided between a region outside the door 50 and the inside electrode unit 21A, the inside electrode unit 21A is not necessarily provided closer to inside than the central position in the thickness direction in the door 50.

The inside door operation unit 40A and the outside door operation unit 40B are desirably electrically insulated from each other. Moreover, the inside electrode unit 21A and the region outside the door 50 are desirably electrically insulated from each other. In order to reliably electrically insulating them from each other, the shield unit 63 is desirably provided between the inside door operation unit 40A and the outside door operation unit 40B and between the inside electrode unit 21A and the region outside the door 50. At least a portion of the shield unit 63 may be provided between the inside door operation unit 40A and the outside door operation unit 40B or between the inside electrode unit 21B and the region outside the door 50. At least a portion of the shield unit 63 is desirably provided closer to outside the door 50 than the inside electrode unit 21A. For example, the shield unit 63 may have a shape that extends to a portion other than a portion between the inside door operation unit 40A and the outside door operation unit 40B and a portion between the inside electrode unit 21A and the region outside the door 50. Moreover, the shield unit 63 may have a shape that partially extends outward from the door 50.

Other configurations are substantially similar to those of the authentication communication system according to the foregoing first or second embodiment.

Moreover, the control operation of the authentication communication system according to the present modification example may be an operation in which inside and outside in the control flow illustrated in FIG. 12 or FIG. 13 are reversed.

For example, in a case where a control operation corresponding to FIG. 12 is performed in the present modification example, the controller 42 first detects the operation state of the outside door operation unit 40B with use of the outside door operation detector 61B. Next, the controller 42 determines whether or not the operation state of the outside door operation unit 40B is the predetermined state. In a case where controller 42 determines that the operation state of the outside door operation unit 40B is the predetermined state, the controller 42 controls the lock unit 41 to unlock the door 50. In contrast, in a case where the controller 42 determines that the operation state of the outside door operation unit 40B is not the predetermined state, the controller 42 next determines whether or not the authentication ID is received from the authentication ID transmission device 10A through the inside electrode unit 21A, and executes the ID authentication processing in accordance with a determination result.

Moreover, in a case where the controller 42 performs a control operation corresponding to FIG. 13 in the present modification example, the controller 42 first determines whether or not the authentication ID is received from the authentication ID transmission device 10A through the inside electrode unit 21A, and executes the ID authentication processing in accordance with a determination result. In a case where the controller 42 determines that the ID authentication is approved, the controller 42 next controls the lock unit 41 to unlock the door 50. In contrast, in a case where the controller 42 determines that the authentication ID is not received, the controller 42 detects the operation state of the outside door operation unit 40B with use of the outside door operation detector 61B. In a case where the controller 42 determines that the operation state of the outside door operation unit 40B is the predetermined state, the controller 42 controls the lock unit 41 to unlock the door 50.

5. Other Embodiments

The technology achieved by present disclosure is not limited to description of the above-described respective embodiments, and may be modified in a variety of ways.

An opening-closing unit in the technology achieved by the present disclosure may be, for example, any door that is spatially opened or closed. Specifically, the opening-closing unit may be a door of a security management section, a door of a hotel, a door of collective housing, a door of a house, an outdoor door, an indoor door, a door of a private room, a door of a toy, a door of a vehicle, a door of a train, a door of an automobile, a door of an elevator, a door of an automatic ticket gate, a door of a locker, doors of various electrical appliances, a door of a refrigerator, a door of a washing machine, a door of a microwave oven, a retractable door, a sliding door, a shutter door, a gate door, a pole type door, or the like. The opening-closing unit in the technology achieved by the present disclosure is not limited to an opening-closing unit used for entry and exit of a human. For example, the opening-closing unit in the technology achieved by the present disclosure may be a window.

Moreover, in the foregoing respective embodiments, the authentication ID transmission device 10A and the authentication ID reception device may be replaced with each other. Further, a device held by the user may be a first communication device that allows for both transmission and reception. Moreover, a device held by the user may be a lockable bracelet-shaped device including a lock unit. Further, a device provided to the door 50 may be a second communication device that allows for both transmission and reception. In this case, the first communication device is a lockable bracelet-shaped device, and the bracelet-shaped device may be locked or unlocked in accordance with a result of authentication processing between the first communication device and the second communication device.

Further, in the foregoing respective embodiments, locking and unlocking may be replaced with each other. For example, in the foregoing first embodiment, in a case where the controller 42 approves authentication of the authentication ID transmission device 10A, and detects the predetermined state as the operation state, the controller 42 may lock the door 50.

Furthermore, each of the components in the foregoing respective embodiments may be divided into a plurality of components, and the plurality of divided components may have different functions.

Moreover, in the foregoing respective embodiments, the controller 42 may include a communication controller that mainly performs operation control related to communication and a door locking controller that mainly performs operation control related to locking of the door 50.

Moreover, the present technology may have the following configurations, for example.

(1)

An opening-closing control device, including:

a first electrode unit and a second electrode unit that perform communication with an authenticated communication device;

an authentication processor that performs authentication processing on the authenticated communication device on the basis of a result of the communication with the authenticated communication device;

an opening-closing operation unit that performs an operation on a lockable opening-closing unit;

an operation detector that detects an operation state of the opening-closing operation unit; and a controller that locks or unlocks the opening-closing unit on the basis of a result of the authentication processing and a result of detection of the operation state.

(2)

The opening-closing control device according to (1), in which the authenticated communication device is held by an operator of the opening-closing unit, the first electrode unit and the second electrode unit are mounted on the opening-closing unit, and one of the first electrode unit and the second electrode unit performs communication using a human body as a communication medium with the authenticated communication device.

(3)

The opening-closing control device according to (1) or (2), in which the controller locks or unlocks the opening-closing unit in a case where authentication of the authenticated communication device is approved and a predetermined state is detected as the operation state.

(4)

The opening-closing control device according to (3), in which the operation detector starts detection of the operation state of the opening-closing operation unit after the authentication of the authenticated communication device is approved.

(5)

The opening-closing control device according to (3), in which the authentication processor performs the authentication processing in a case where the predetermined state is detected.

(6)

The opening-closing control device according to any one of (1) to (5), further including an opening-closing detector that detects an opening-closing state of the opening-closing unit, in which the controller locks the opening-closing unit on the basis of a result of detection by the opening-closing detector.

(7)

The opening-closing control device according to (6), in which the controller locks the opening-closing unit in a case where the opening-closing detector detects that the opening-closing unit is closed.

(8)

The opening-closing control device according to (3), in which the opening-closing operation unit includes an inside opening-closing operation unit that performs an operation on the opening-closing unit from inside the opening-closing unit, and an outside opening-closing operation unit that performs an operation on the opening-closing unit from outside the opening-closing unit.

(9)

The opening-closing control device according to (8), in which the operation detector includes an inside operation detector that detects an operation state of the inside opening-closing operation unit, and an outside operation detector that detects an operation state of the outside opening-closing operation unit.

(10)

The opening-closing control device according to (9), in which the first electrode unit includes an inside electrode unit, and an outside electrode unit provided closer to outside than a position of the inside electrode unit in a thickness direction in the opening-closing unit.

(11)

The opening-closing control device according to (10), in which the controller causes the operation detector to detect an operation state of one of the inside opening-closing operation unit and the outside opening-closing operation unit on the basis of a signal related to a received voltage of the inside electrode unit and a signal related to a received voltage of the outside electrode unit.

(12)

The opening-closing control device according to (11), in which the controller performs comparison between a first signal value related to the received voltage of the inside electrode unit and a second signal value related to the received voltage of the outside electrode unit, in a case where the first signal value is larger, the controller causes the inside operation detector to detect the operation state of the inside opening-closing operation unit, and in a case where the second signal value is larger, the controller causes the outside operation detector to detect the operation state of the outside opening-closing operation unit.

(13)

The opening-closing control device according to any one of (8) to (12), in which the inside opening-closing operation unit and the outside opening-closing operation unit are electrically insulated from each other.

(14)

The opening-closing control device according to any one of (10) to (12), in which the inside electrode unit and the outside electrode unit are electrically insulated from each other.

(15)

The opening-closing control device according to any one of (10) to (12), further including a selector that selects one of the inside electrode unit and the outside electrode unit through which communication is to be performed.

(16)

The opening-closing control device according to (15), in which the selector selects the inside electrode unit in a case where the operation state of the inside opening-closing operation unit is the predetermined state, and selects the outside electrode unit in a case where the operation state of the outside opening-closing operation unit is the predetermined state.

(17)

The opening-closing control device according to (3), in which the opening-closing operation unit includes an inside opening-closing operation unit that performs an operation on the opening-closing unit from inside the opening-closing unit, the operation detector includes an inside operation detector that detects an operation state of the inside opening-closing operation unit, and the first electrode unit includes an outside electrode unit provided closer to outside than a central position in a thickness direction in the opening-closing unit.

(18)

The opening-closing control device according to (3), in which the opening-closing operation unit includes an outside opening-closing operation unit that performs an operation on the opening-closing unit from outside the opening-closing unit, the operation detector includes an outside operation detector that detects an operation state of the outside opening-closing operation unit, and the first electrode unit includes an inside electrode unit provided closer to inside than a central position in a thickness direction in the opening-closing unit.

(19)

An opening-closing control method, including:

performing communication, through a first electrode unit and a second electrode unit provided in an authentication communication device, between the authentication communication device and an authenticated communication device;

performing authentication processing on the authenticated communication device on the basis of a result of the communication between the authentication communication device and the authenticated communication device;

detecting an operation state of an opening-closing operation unit that performs an operation on a lockable opening-closing unit; and locking or unlocking the opening-closing unit on the basis of a result of the authentication processing and a result of detection of the operation state.

(20)

An opening-closing control system provided with an authenticated communication device and an authentication communication device that performs authentication processing on the authenticated communication device, the authentication communication device including:

a first electrode unit and a second electrode unit that perform communication with an authenticated communication device;

an authentication processor that performs authentication processing on the authenticated communication device on the basis of a result of the communication with the authenticated communication device;

an opening-closing operation unit that performs an operation on a lockable opening-closing unit;

an operation detector that detects an operation state of the opening-closing operation unit; and a controller that locks or unlocks the opening-closing unit on the basis of a result of the authentication processing and a result of detection of the operation state.

(21)

The opening-closing control device according to any one of (10) to (12), in which the inside electrode unit is provided closer to inside than a central position in the thickness direction in the opening-closing unit, and the outside electrode unit is provided closer to outside than the central position in the thickness direction in the opening-closing unit.

(22)

The opening-closing control device according to any one of (10) to (12), further including a shield unit that is provided in the opening-closing unit, and of which at least a portion is disposed between the inside electrode unit and the outside electrode unit.

(23)

The opening-closing control device according to any one of (10) to (12), in which the second electrode unit is disposed at a substantially center in the thickness direction in the opening-closing unit.

(24)

The opening-closing control device according to (10) or (15), in which the authentication processor performs the authentication processing on the authenticated communication device on the basis of a result of communication through one electrode unit selected from the inside electrode unit and the outside electrode unit by the selector.

(25)

The opening-closing control device according to (3), in which the opening-closing operation unit includes an inside opening-closing operation unit that performs an operation on the opening-closing unit from inside the opening-closing unit, the operation detector includes an inside operation detector that detects an operation state of the inside opening-closing operation unit, the first electrode unit includes an outside electrode unit, and a shield unit is further included, the shield unit that is provided in the opening-closing unit and of which at least a portion is disposed closer to inside than the outside electrode unit.

(26)

The opening-closing control device according to (3), in which the opening-closing operation unit includes an outside opening-closing operation unit that performs an operation on the opening-closing unit from outside the opening-closing unit, the operation detector includes an outside operation detector that detects an operation state of the outside opening-closing operation unit, the first electrode unit includes an inside electrode unit, and a shield unit is further included, the shield unit that is provided in the opening-closing unit and of which at least a portion is disposed closer to outside than the inside electrode unit.

This application claims the benefit of Japanese Priority Patent Application No. 2016-070460 filed with the Japan Patent Office on Mar. 31, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof

The invention claimed is:

1. An opening-closing control device, comprising:
a first electrode unit and a second electrode unit that perform communication with a communication device that is subject to a first authentication processing to result in an initially authenticated communication device, wherein the first authentication processing includes confirming receipt of an authentication ID of the communication device;
an authentication processor that performs a second authentication processing on the initially authenticated communication device on a basis of a result of the communication with the communication device;
an opening-closing operation unit that performs an operation on a lockable opening-closing unit;
an operation detector that detects an operation state of the opening-closing operation unit; and
a controller that locks or unlocks the opening-closing unit on a basis of a result of the second authentication processing and a result of detection of the operation state;
wherein the controller locks or unlocks the opening-closing unit in a case where the second authentication processing of the initially authenticated communication device is approved and a predetermined state is detected as the operation state;
wherein the opening-closing operation unit includes
an inside opening-closing operation unit that performs an operation on the opening-closing unit from inside the opening-closing unit, and
an outside opening-closing operation unit that performs an operation on the opening-closing unit from outside the opening-closing unit;
wherein the operation detector includes
an inside operation detector that detects an operation state of the inside opening-closing operation unit, and
an outside operation detector that detects an operation state of the outside opening-closing operation unit;
wherein the first electrode unit includes
an inside electrode unit, and
an outside electrode unit provided closer to a location outside the opening-closing unit than a position of the inside electrode unit; and
wherein the controller causes the operation detector to detect an operation state of one of the inside opening-closing operation unit and the outside opening-closing operation unit on a basis of a signal related to a received voltage of the inside electrode unit and a signal related to a received voltage of the outside electrode unit.

2. The opening-closing control device according to claim 1, wherein
the communication device is held by an operator of the opening-closing unit,
the first electrode unit and the second electrode unit are mounted on the opening-closing unit, and
one of the first electrode unit and the second electrode unit performs communication using a human body as a communication medium with the communication device.

3. The opening-closing control device according to claim 1, wherein the operation detector starts detection of the operation state of the opening-closing operation unit after the second authentication processing of the initially authenticated communication device is approved.

4. The opening-closing control device according to claim 1, wherein the authentication processor performs the second authentication processing in a case where the predetermined state is detected.

5. The opening-closing control device according to claim 1, further comprising an opening-closing detector that detects an opening-closing state of the opening-closing unit, wherein
the controller locks the opening-closing unit on a basis of a result of detection by the opening-closing detector.

6. The opening-closing control device according to claim 5, wherein the controller locks the opening-closing unit in a case where the opening-closing detector detects that the opening-closing unit is closed.

7. The opening-closing control device according to claim 1, wherein
the controller performs comparison between a first signal value related to the received voltage of the inside electrode unit and a second signal value related to the received voltage of the outside electrode unit,
in a case where the first signal value is larger, the controller causes the inside operation detector to detect the operation state of the inside opening-closing operation unit, and
in a case where the second signal value is larger, the controller causes the outside operation detector to detect the operation state of the outside opening-closing operation unit.

8. The opening-closing control device according to claim 1, wherein the inside opening-closing operation unit and the outside opening-closing operation unit are electrically insulated from each other.

9. The opening-closing control device according to claim 1, wherein the inside electrode unit and the outside electrode unit are electrically insulated from each other.

10. The opening-closing control device according to claim 1, further comprising a selector that selects one of the inside electrode unit and the outside electrode unit through which communication is to be performed.

11. The opening-closing control device according to claim 10, wherein the selector selects the inside electrode unit in a case where the operation state of the inside opening-closing operation unit is the predetermined state, and selects the outside electrode unit in a case where the operation state of the outside opening-closing operation unit is the predetermined state.

12. An opening-closing control method, comprising:
performing communication, through a first electrode unit and a second electrode unit provided in an authentication communication device, between the authentication communication device and a communication device that is subject to a first authentication processing to result in an initially authenticated communication device, wherein the first authentication processing includes confirming receipt of an authentication ID of the authentication communication device;
performing a second authentication processing on the initially authenticated communication device on a basis of a result of the communication between the authentication communication device and the communication device;
detecting an operation state of an opening-closing operation unit that performs an operation on a lockable opening-closing unit;
locking or unlocking the opening-closing unit on a basis of a result of the second authentication processing and a result of detection of the operation state;
wherein the controller locks or unlocks the opening-closing unit in a case where second authentication processing of the initially authenticated communication device is approved and a predetermined state is detected as the operation state;
wherein the opening-closing operation unit includes
an inside opening-closing operation unit that performs an operation on the opening-closing unit from inside the opening-closing unit, and
an outside opening-closing operation unit that performs an operation on the opening-closing unit from outside the opening-closing unit;
wherein the operation detector includes
an inside operation detector that detects an operation state of the inside opening-closing operation unit, and
an outside operation detector that detects an operation state of the outside opening-closing operation unit;
wherein the first electrode unit includes
an inside electrode unit, and
an outside electrode unit provided closer to a location outside the opening-closing unit than a position of the inside electrode unit; and
causing, by the controller, the operation detector to detect an operation state of one of the inside opening-closing operation unit and the outside opening-closing operation unit on a basis of a signal related to a received voltage of the inside electrode unit and a signal related to a received voltage of the outside electrode unit.

13. An opening-closing control system provided with an authentication communication device that performs authentication processing on a communication device, the authentication communication device comprising:
a first electrode unit and a second electrode unit that perform communication with the communication device, the communication device being subject to a first authentication processing to result in an initially authenticated communication device, wherein the first authentication processing includes confirming receipt of an authentication ID of the communication device;
an authentication processor that performs second authentication processing on the initially authenticated communication device on a basis of a result of the communication with the communication device;
an opening-closing operation unit that performs an operation on a lockable opening-closing unit;
an operation detector that detects an operation state of the opening-closing operation unit; and
a controller that locks or unlocks the opening-closing unit on a basis of a result of the second authentication processing and a result of detection of the operation state;
wherein the controller locks or unlocks the opening-closing unit in a case where the second authentication processing of the initially authenticated communication device is approved and a predetermined state is detected as the operation state;
wherein the opening-closing operation unit includes
an inside opening-closing operation unit that performs an operation on the opening-closing unit from inside the opening-closing unit, and
an outside opening-closing operation unit that performs an operation on the opening-closing unit from outside the opening-closing unit;
wherein the operation detector includes
an inside operation detector that detects an operation state of the inside opening-closing operation unit, and an outside operation detector that detects an operation state of the outside opening-closing operation unit;
wherein the first electrode unit includes
an inside electrode unit, and
an outside electrode unit provided closer to a location outside the opening-closing unit than a position of the inside electrode unit; and
wherein the controller causes the operation detector to detect an operation state of one of the inside opening-closing operation unit and the outside opening-closing operation unit on a basis of a signal related to a received voltage of the inside electrode unit and a signal related to a received voltage of the outside electrode unit.

14. The opening-closing control system according to claim 13, wherein
the communication device is held by an operator of the opening-closing unit,
the first electrode unit and the second electrode unit are mounted on the opening-closing unit, and
one of the first electrode unit and the second electrode unit performs communication using a human body as a communication medium with the communication device.

15. The opening-closing control system according to claim 13, wherein the operation detector starts detection of the operation state of the opening-closing operation unit after the second authentication processing of the initially authenticated communication device is approved.

16. The opening-closing control system according to claim 13, wherein the authentication processor performs the second authentication processing in a case where the predetermined state is detected.

17. The opening-closing control system according to claim 13, further comprising an opening-closing detector that detects an opening-closing state of the opening-closing unit, wherein
the controller locks the opening-closing unit on a basis of a result of detection by the opening-closing detector.

18. The opening-closing control system according to claim 17, wherein the controller locks the opening-closing unit in a case where the opening-closing detector detects that the opening-closing unit is closed.

* * * * *